United States Patent
Gutierrez-Sheris

(10) Patent No.: US 9,037,510 B2
(45) Date of Patent: May 19, 2015

(54) MONEY-TRANSFER TECHNIQUES

(75) Inventor: Luis Eduardo Gutierrez-Sheris, Ridgewood, NJ (US)

(73) Assignee: UniTeller Financial Services, Inc., Rochelle Park, NJ (US)

( * ) Notice: Subject to any disclaimer, the term of this patent is extended or adjusted under 35 U.S.C. 154(b) by 354 days.

(21) Appl. No.: 12/111,550

(22) Filed: Apr. 29, 2008

(65) Prior Publication Data

US 2008/0222039 A1     Sep. 11, 2008

Related U.S. Application Data

(60) Division of application No. 10/752,396, filed on Jan. 6, 2004, which is a continuation of application No. 09/635,321, filed on Aug. 9, 2000, now Pat. No. 6,938,013.

(60) Provisional application No. 60/174,646, filed on Jan. 5, 2000.

(51) Int. Cl.
*G06Q 20/00*       (2012.01)
*G06Q 40/02*       (2012.01)
(Continued)

(52) U.S. Cl.
CPC ................ *G06Q 40/02* (2013.01); *G06Q 20/04* (2013.01); *G06Q 20/10* (2013.01); *G06Q 20/105* (2013.01);
(Continued)

(58) Field of Classification Search
USPC ................................................. 705/50–80, 42
See application file for complete search history.

(56) References Cited

U.S. PATENT DOCUMENTS

| 4,625,276 A | 11/1986 | Benton et al. |
| 4,758,714 A | 7/1988 | Carlson et al. |

(Continued)

FOREIGN PATENT DOCUMENTS

| JP | 402024762 A | 7/1998 |
| WO | WO 99/18549 | 4/1999 |

(Continued)

OTHER PUBLICATIONS

Nov. 10, 2008 US Office Action that issued in related U.S. Appl. No. 09/635,330.

(Continued)

*Primary Examiner* — John Hayes
*Assistant Examiner* — John M Winter
(74) *Attorney, Agent, or Firm* — Cowan, Liebowitz & Latman, P.C.; Mark Montague; Serge Krimnus

(57) ABSTRACT

A technique for transferring money between a customer and a beneficiary comprises a money-transfer company, and a plurality of selling agents and paying agents. The money-transfer company maintains a server, a database, and a communications interface for communicating, via a telephone network and/or the Internet, with data terminals located at the selling and paying agents' sites. Customer transaction cards are distributed to customers. These cards have a visible card number and a corresponding alphanumeric card code stored in, e.g., a magnetic strip. In response to a customer's request, the money-transfer company activates the customer's transaction card by loading customer and beneficiary information into a corresponding transaction card record stored in the database. A selling agent initiates a money-transfer request from a data terminal. Specifically, the selling agent enters a monetary amount and swipes the customer's card in a magnetic strip reader located on the data terminal. Upon receiving the money amount and the customer's card code, the company creates a corresponding and unique transaction record associating the customer, his (her) card and the beneficiary, in the database and returns a fund pick-up ("folio") number to the customer. The customer discloses the folio number to the beneficiary, who, with this number and appropriate personal identification, collects the transferred money from a paying agent. The customer can use the same transaction card to make subsequent money transfers, in any amount, to the same beneficiary.

14 Claims, 13 Drawing Sheets

(51) Int. Cl.
*G06Q 20/04* (2012.01)
*G06Q 20/10* (2012.01)
*G06Q 20/24* (2012.01)
*G06Q 20/34* (2012.01)
*G06Q 20/38* (2012.01)
*G06Q 20/40* (2012.01)
*G07F 7/02* (2006.01)
*G07F 19/00* (2006.01)

(52) U.S. Cl.
CPC .............. *G06Q 20/108* (2013.01); *G06Q 20/24* (2013.01); *G06Q 20/342* (2013.01); *G06Q 20/347* (2013.01); *G06Q 20/385* (2013.01); *G06Q 20/40* (2013.01); *G07F 7/025* (2013.01); *G07F 19/211* (2013.01)

(56) References Cited

U.S. PATENT DOCUMENTS

| | | | |
|---|---|---|---|
| 4,993,068 A | 2/1991 | Piosenka et al. | |
| 4,999,806 A | 3/1991 | Chernow et al. | |
| 5,276,311 A | 1/1994 | Hennige | |
| 5,283,829 A | 2/1994 | Anderson | |
| 5,408,513 A | 4/1995 | Busch, Jr. et al. | |
| 5,448,043 A | 9/1995 | Nakano et al. | |
| 5,461,217 A | 10/1995 | Claus | |
| 5,513,250 A | 4/1996 | McAllister | |
| 5,530,232 A | 6/1996 | Taylor | |
| 5,578,808 A | 11/1996 | Taylor | |
| 5,590,197 A | 12/1996 | Chen et al. | |
| 5,627,355 A | 5/1997 | Rahman et al. | |
| 5,650,604 A | 7/1997 | Marcous | |
| 5,657,388 A | 8/1997 | Weiss | |
| 5,659,165 A | 8/1997 | Jennings et al. | |
| 5,677,955 A | 10/1997 | Doggett et al. | |
| 5,704,046 A | 12/1997 | Hogan | |
| 5,739,512 A | 4/1998 | Tognazzini | |
| 5,748,740 A | 5/1998 | Curry et al. | |
| 5,753,899 A | 5/1998 | Gomm et al. | |
| 5,794,207 A * | 8/1998 | Walker et al. | 705/77 |
| 5,796,832 A | 8/1998 | Kawan | |
| 5,799,087 A | 8/1998 | Rosen | |
| 5,826,245 A | 10/1998 | Sandberg-Diment | |
| 5,859,419 A | 1/1999 | Wynn | |
| 5,898,154 A | 4/1999 | Rosen | |
| 5,903,881 A | 5/1999 | Schrader et al. | |
| 5,926,548 A | 7/1999 | Okamoto | |
| 5,936,221 A | 8/1999 | Corder et al. | |
| 5,949,880 A | 9/1999 | Curry et al. | |
| 5,953,710 A | 9/1999 | Fleming | |
| 5,961,593 A | 10/1999 | Gabber et al. | |
| 5,963,647 A | 10/1999 | Downing et al. | |
| 5,988,510 A | 11/1999 | Tuttle et al. | |
| 5,991,748 A * | 11/1999 | Taskett | 705/41 |
| 6,000,832 A | 12/1999 | Franklin et al. | |
| 6,006,200 A * | 12/1999 | Boies et al. | 705/26.42 |
| 6,011,858 A | 1/2000 | Stock et al. | |
| 6,012,048 A | 1/2000 | Gustin et al. | |
| 6,012,144 A | 1/2000 | Pickett | |
| 6,016,476 A | 1/2000 | Maes et al. | |
| 6,018,724 A | 1/2000 | Arent | |
| 6,029,887 A | 2/2000 | Furuhashi et al. | |
| 6,032,135 A | 2/2000 | Molano et al. | |
| 6,039,250 A | 3/2000 | Ito et al. | |
| 6,041,314 A | 3/2000 | Davis | |
| 6,049,785 A | 4/2000 | Gifford | |
| 6,073,124 A | 6/2000 | Krishnan et al. | |
| 6,076,075 A | 6/2000 | Teicher | |
| 6,105,008 A | 8/2000 | Davis et al. | |
| 6,129,274 A | 10/2000 | Suzuki | |
| 6,163,771 A | 12/2000 | Walker et al. | |
| 6,189,787 B1 | 2/2001 | Dorf | |
| 6,205,553 B1 | 3/2001 | Stoffel et al. | |
| 6,206,283 B1 | 3/2001 | Bansal et al. | |
| 6,250,557 B1 | 6/2001 | Forslund et al. | |
| 6,282,656 B1 | 8/2001 | Wang | |
| 6,327,363 B1 | 12/2001 | Henderson et al. | |
| 6,394,341 B1 | 5/2002 | Mäkipää et al. | |
| 6,394,343 B1 | 5/2002 | Berg et al. | |
| 6,401,206 B1 | 6/2002 | Khan et al. | |
| 6,422,462 B1 | 7/2002 | Cohen | |
| 6,434,403 B1 | 8/2002 | Ausems et al. | |
| 6,439,345 B1 * | 8/2002 | Recktenwald et al. | 186/55 |
| 6,439,456 B1 | 8/2002 | Bansal et al. | |
| 6,470,317 B1 | 10/2002 | Ladd et al. | |
| 6,473,500 B1 | 10/2002 | Risafi et al. | |
| 6,488,203 B1 | 12/2002 | Stoutenburg et al. | |
| 6,502,747 B1 | 1/2003 | Stoutenburg et al. | |
| 6,554,184 B1 | 4/2003 | Amos | |
| 6,609,113 B1 | 8/2003 | O'Leary et al. | |
| 6,615,189 B1 | 9/2003 | Phillips et al. | |
| 6,636,833 B1 | 10/2003 | Flitcroft et al. | |
| 6,701,303 B1 | 3/2004 | Dunn et al. | |
| 6,736,314 B2 | 5/2004 | Cooper et al. | |
| 6,886,095 B1 * | 4/2005 | Hind et al. | 713/168 |
| 7,058,817 B1 | 6/2006 | Ellmore | |
| 7,072,864 B2 | 7/2006 | Brake, Jr. et al. | |
| 7,155,614 B2 | 12/2006 | Ellmore | |
| 7,177,835 B1 | 2/2007 | Walker et al. | |
| 7,236,950 B2 | 6/2007 | Savage et al. | |
| 7,269,575 B1 | 9/2007 | Concanon et al. | |
| 7,280,645 B1 | 10/2007 | Allen et al. | |
| 2001/0025265 A1 | 9/2001 | Takayasu | |
| 2002/0026394 A1 | 2/2002 | Savage et al. | |
| 2006/0122931 A1 | 6/2006 | Walker et al. | |
| 2006/0218096 A1 | 9/2006 | Walker et al. | |
| 2006/0218097 A1 | 9/2006 | Walker et al. | |
| 2006/0218098 A1 | 9/2006 | Walker et al. | |

FOREIGN PATENT DOCUMENTS

| | | | | |
|---|---|---|---|---|
| WO | WO 01/53971 | * | 1/2000 | G06F 17/00 |
| WO | WO 00/75889 | | 12/2000 | |

OTHER PUBLICATIONS

Jul. 20, 2009 US Office Action that issued in related U.S. Appl. No. 09/829,614.

Office Action dated Mar. 5, 2010 in related U.S. Appl. No. 09/829,614.

Sep. 28, 2010 US Office Action that issued in related U.S. Appl. No. 10/752,396.

HIPPA information series, May 2003.

Aug. 7, 2008 US Office that Action issued in related U.S. Appl. No. 10/752,396.

Office action dated Feb. 2, 2010 in related U.S. Appl. No. 10/752,396.

* cited by examiner

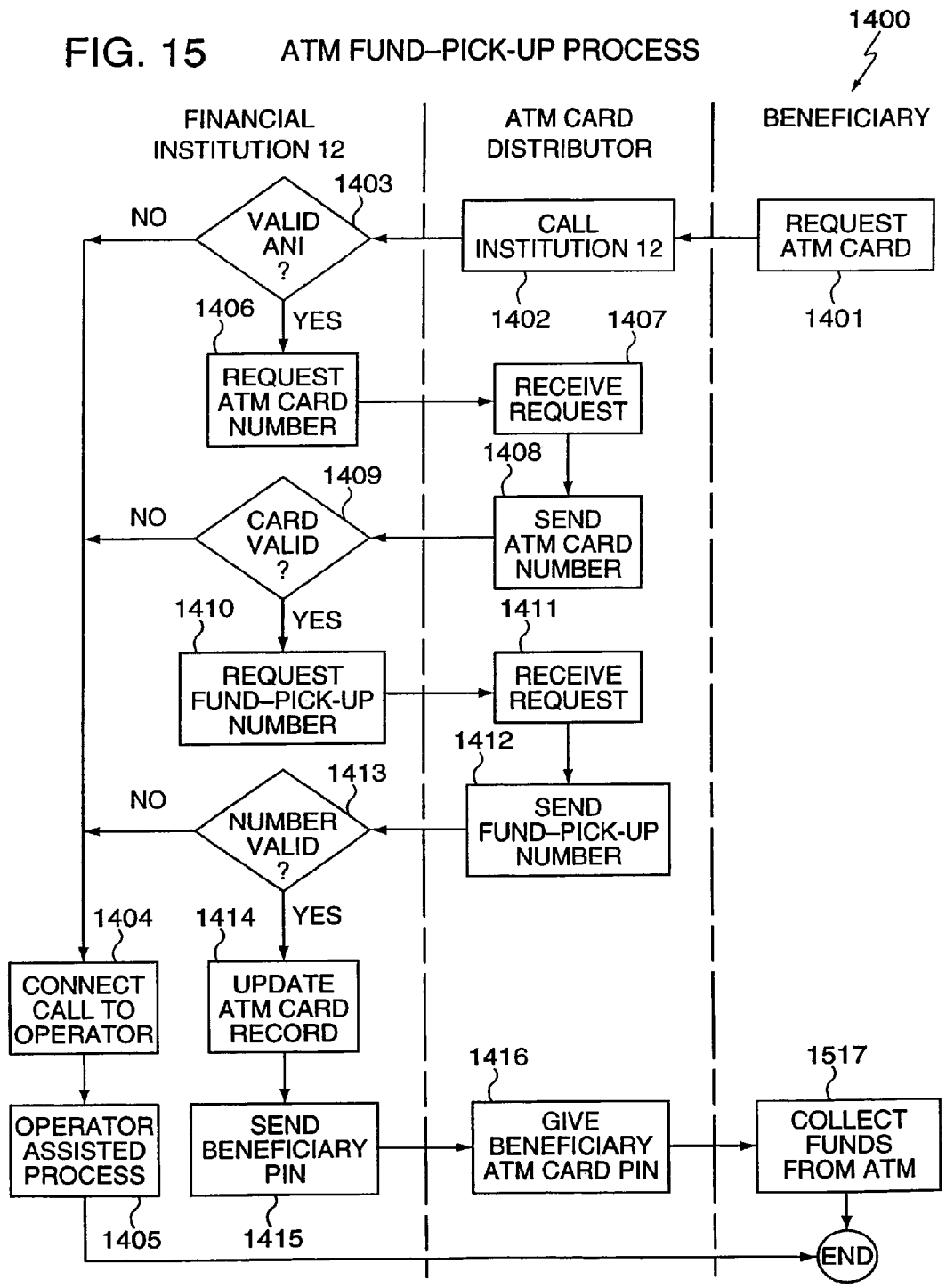

MONEY-TRANSFER TECHNIQUES

RELATED APPLICATION

This application is a division of U.S. patent application Ser. No. 10/752,396, filed Jan. 6, 2004, which is a continuation of U.S. patent application Ser. No. 09/635,321, filed Aug. 9, 2000, which issued as U.S. Pat. No. 6,938,013 on Aug. 30, 2005, and which claims the benefit of U.S. provisional patent application Ser. No. 60/174,646, filed Jan. 5, 2000, which is incorporated herein by reference.

BACKGROUND OF THE INVENTION

A. Field of the Invention

The present invention relates generally to techniques, specifically apparatus and accompanying methods, of conducting financial transactions, and particularly to commercial systems for transferring money and executing related monetary functions between multiple remotely located parties.

B. Description of the Prior Art

Financial firms have used a variety of processes for transferring money between a customer and a beneficiary. In a typical money transfer process, a customer would visit the facilities of a selling agent who is part of or associated with a financial firm. The customer would normally be asked to complete a form giving information such as the amount to be transferred, and the customer's and beneficiary's names, addresses, telephone numbers, etc. A customer would then submit a completed form to the transfer agent along with a payment, usually in cash, or via a credit card, certified check, or the like. The payment would usually include at least the transfer amount plus a transaction fee. The selling agent would then transmit appropriate information to the facilities of a paying agent where the beneficiary can readily collect the transferred funds.

Those concerned with the development of such processes have long recognized the need for reducing the time and effort required to execute a money transfer, while still maintaining a sufficiently high degree of security from threats, such as fraud, theft, third-party interception with redirection and interference of payment information.

In many prior-art systems, selling agents perform some steps with due speed and security. For instance, once a customer's transaction details and funds are processed, most selling agents can promptly initiate the transaction by electronically transmitting instructions to an appropriate agency. Such transmissions normally occur over e.g., a telephone network. Typically, the customer or agency would inform the beneficiary, e.g., via a telephone, that the funds are available for delivery at a paying agent's facility. The beneficiary, who, in fact, may have been waiting at a paying agent's facility for the transfer, would present proper identification, e.g., a driver's license, passport, etc., to the paying agent. After reviewing the beneficiary's identification, the paying agent would then make the payment.

Although most prior-art processes can execute a money transfer within a reasonably short time, these processes still require considerable time and effort on the part of the customer and the agents. For instance, most money-transfer processes require that, for every requested transaction, a customer complete long, involved forms that demand considerable time and effort to complete properly. In addition, selling agents must review the customer's forms in detail and then manually input the customer's data for transmission to an appropriate agency.

Hence, a need exists in the art for a money transfer system that is significantly easier and quicker to use by both transferring parties and beneficiaries.

SUMMARY OF THE INVENTION

The present invention relates to a method of transferring money from a customer to a beneficiary that advantageously overcomes the deficiencies of conventional money transfer technologies known in the art.

In accordance with the invention, money-transfer devices, specifically transaction cards, are first distributed to a plurality of customers. Each money-transfer device is equipped with a unique device code. Next, a device database is created which comprises a set of device records in which each of the unique device codes is loaded into a different corresponding one of the device records. Customer data, identifying each customer who holds, e.g., a transaction card, (transferring party) along with accompanying beneficiary data, as specified by that customer, is written into the device records associated with the device code of that specific transaction card. Thereafter, the customer actually initiates a transfer of a particular amount of money from that customer to his (her) beneficiary, using, for example, a transaction card.

A more particular aspect of the invention is directed to a technique for transferring money between a customer and a beneficiary via a system comprising a money-transfer company, and a plurality of selling agents and paying agents. The money-transfer company includes a host computer, a database storage device, and a communications interface for communicating, via a telephone network and/or the Internet, with data terminals or client computers located at the selling and paying agents' sites. Customer transaction cards, distributed to customers by the selling agents, contain a visible card number and an alphanumeric card code stored in a magnetic strip. By customer request, the money-transfer company activates the customer's transaction card and at the same time loads the customer and beneficiary information into a corresponding transaction card record stored in the database storage device. A selling agent initiates a money-transfer request from a data terminal by keying in a money amount and swiping the customer's card in a magnetic strip reader located on the data terminal. Upon receiving the money amount and the customer's card code, the company creates a corresponding transaction record in the database storage device and returns a fund-pick-up number ("folio" number) to the customer. The customer discloses the fund-pick-up number to the beneficiary. Using the fund-pick-up number and appropriate personal identification, the beneficiary collects the transferred money from a paying agent. The customer can subsequently re-use the transaction card to request subsequent money transfers, in any amount, to the same beneficiary, each transfer being accorded a different and unique folio number.

BRIEF DESCRIPTION OF THE DRAWINGS

FIG. 15 depicts a flowchart of the ATM fund pick-up process of an embodiment of the present invention.

DETAILED DESCRIPTION

In general, the money-transfer techniques, described below in detail, enable remotely located selling and paying agents, associated with a money-transfer company, to transfer money from a customer to a beneficiary. A selling agent inputs an amount to be transferred and a customer's transaction code, stored on a passive magnetic "transaction" card via a data terminal that operates either in a stand-alone environment of a selling agent or in conjunction with a client computer co-located thereat. The transaction code corresponds to customer information and beneficiary information stored by the money-transfer agent (i.e., a financial institution). The customer is given a fund-pick-up code (hereinafter also referred to as a "folio" number), which the customer discloses to the beneficiary for use by the latter for claiming the funds at a paying agent.

Use of a passive transaction card is mainly illustrative. Those skilled in these arts will recognize that the invention is applicable to use with other articles, such as a so-called "smart card", which can be separately coded for a given user and which permits use of encoded security information stored internal to the article and which can be "swiped" through a reader or electronically or optically scanned to initiate a transaction. However, for ease of understanding and simplicity of the following description, the invention will now be described in the context of use with a credit-card type transaction card.

Figure 1:
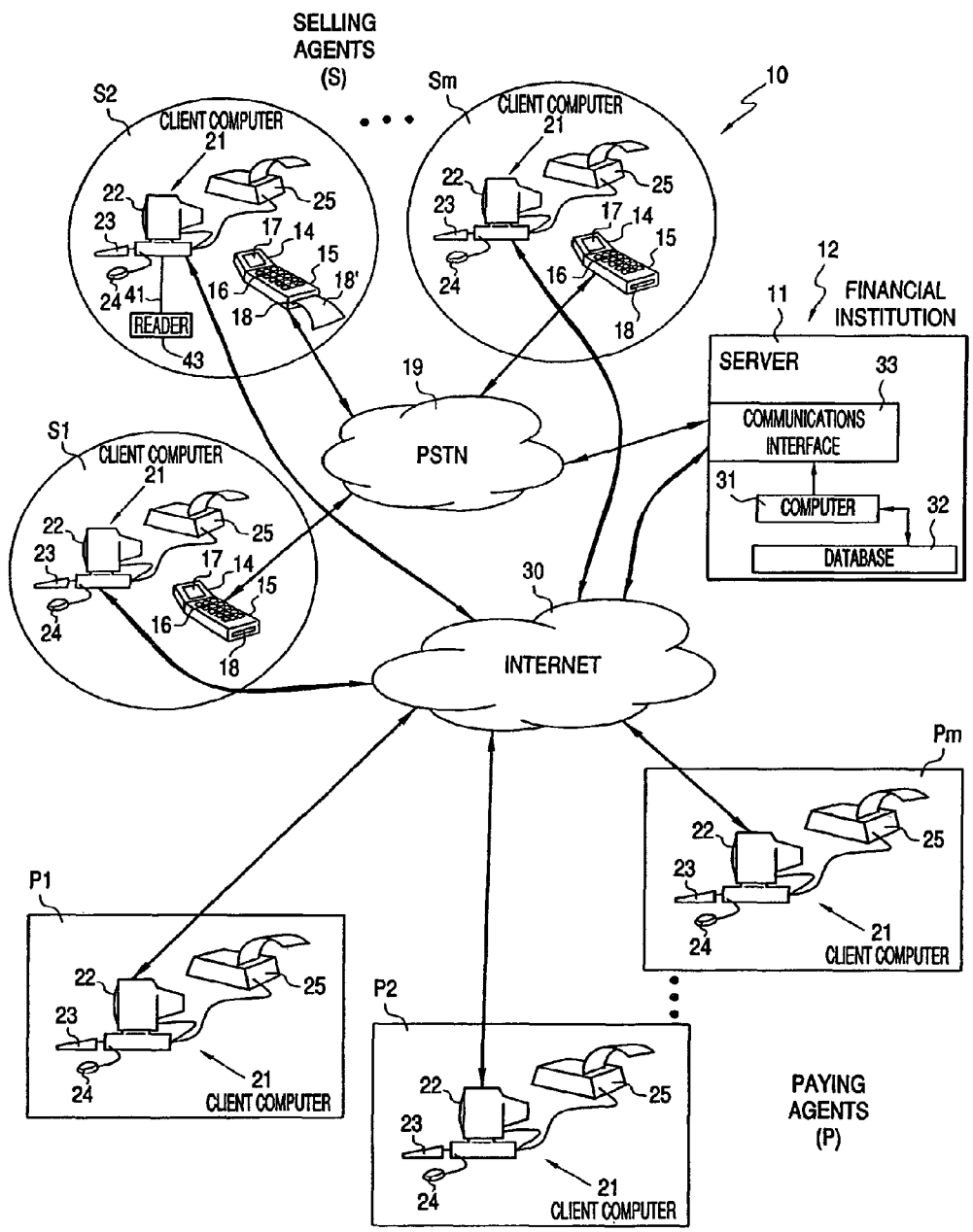
FIG. 1 depicts a high-level schematic diagram of a money-transfer system 10 in accordance with the present invention.

FIG. 1 illustrates money-transfer system 10 comprising money-transfer company 12 (also referred to as a "financial institution"), "n" selling-agent sites S1-Sn and "m" paying-agent sites P1-Pm (where n and m are integers, typically numbering in the thousands, if not larger). Each of the selling-agent sites S1-Sn includes a conventional data transmit-receive (point of sale—POS) terminal 14, which comprises standard magnetic strip ("swipe") card reader 15, keypad 16, printer 18, display 17 and an internal modem (not shown). Sites S1-Sn may also comprise client computer 21, preferably a conventional personal computer (PC), to which associated swipe card reader 43 may also be connected, via connection 41 (for simplicity, the above described connection is shown at only one of the selling agents sites, e.g., site S2). The POS terminals and client computers (with or without swipe card readers) are typically stand-alone devices. Client computer 21 includes display 22, keyboard 23, mouse 24 and printer 25. Paying-agent sites P1-Pm also include client computer 21 having display 22, keyboard 23, mouse 24 and printer 25. Client computers 21 connect to Internet 30 through conventional communications equipment (not specifically shown). Terminals 14 connect to server 11 via PSTN (public switched telephone network) 19. As described below, transactions involving any agent can occur either over the PSTN or through a web-based Internet connection, depending upon the communication facilities available at that agent. For simplicity, we will assume that selling agents utilize either a telephone and/or web-based connection, while paying agents utilize the latter.

Figure 2:
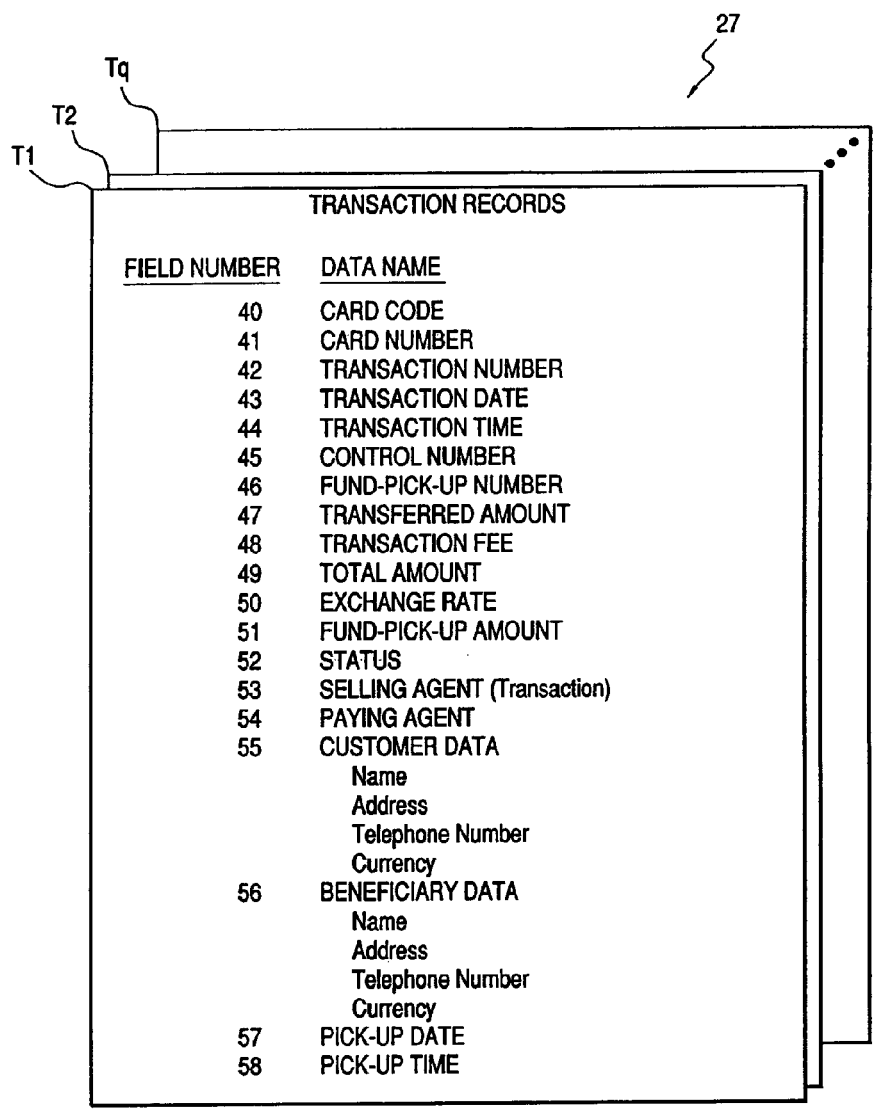
FIG. 2 schematically illustrates transaction data 27 stored as a set of transaction records T1-Tq for use in the system of FIG. 1.
Figure 3:
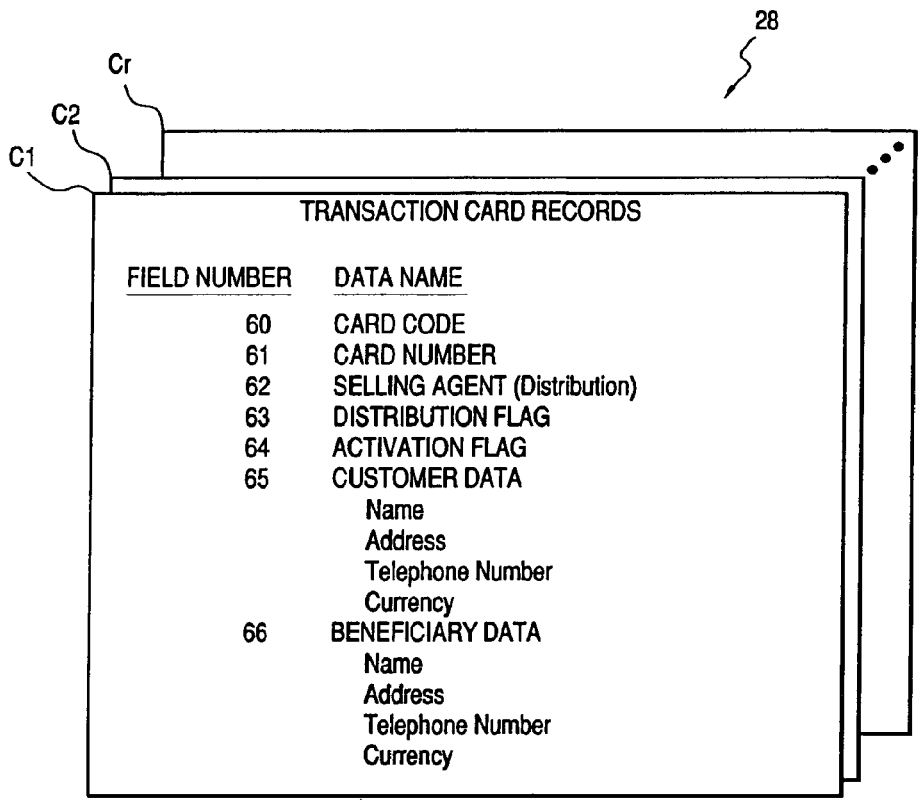
FIG. 3 schematically illustrates transaction card data 28 as a set of transaction card records C1-Cr for use in the system of FIG. 1.

Server 11 (which is described in greater detail below in conjunction with FIGS. 10-12), located at the facilities of financial institution 12, comprises computer 31, database 32 and communications interface 33. Server 11 connects to PSTN 19 and Internet 30 via communications interface 33. Communications interface 33, which is conventional, provides server 11 with a standard modem connection to PSTN 19 and generally a full-time dedicated connection to Internet 30. Database 32 stores money-transfer data, including transaction data 27 and transaction card data 28 as illustrated in FIGS. 2 and 3, respectively. Transaction data 27 comprise a set of "q" transaction records T1-Tq. Transaction card data 28 comprise a set of "r" transaction card records C1-Cr.

As shown in FIG. 2, the transaction records T1-Tq comprise the following data in the indicated data fields shown in Table 1 as follows.

TABLE 1

| TRANSACTION RECORD FIELDS | |
| --- | --- |
| Field 40 | CARD CODE |
| Field 41 | CARD NUMBER |
| Field 42 | TRANSACTION NUMBER |
| Field 43 | TRANSACTION DATE |
| Field 44 | TRANSACTION TIME |
| Field 45 | CONTROL NUMBER |
| Field 46 | FUND-PICK-UP NUMBER |
| Field 47 | TRANSFERRED AMOUNT |
| Field 48 | TRANSACTION FEE |
| Field 49 | TOTAL AMOUNT |
| Field 50 | EXCHANGE RATE |
| Field 51 | FUND-PICK-UP AMOUNT |
| Field 52 | STATUS |
| Field 53 | SELLING AGENT (Transaction) |
| Field 54 | PAYING AGENT |
| Field 55 | CUSTOMER'S Name, Address, Telephone Number and Currency |
| Field 56 | BENEFICIARY'S Name, Address, Telephone Number and Currency |
| Field 57 | PICK-UP DATE |
| Field 58 | PICK-UP TIME |

With reference to FIG. 3, the transaction card records C1-Cr comprise the following data in the data fields shown in Table 2 as follows.

TABLE 2

| TRANSACTION CARD RECORDS FIELD | |
| --- | --- |
| Field 60 | CARD CODE |
| Field 61 | CARD NUMBER |

TABLE 2-continued

| TRANSACTION CARD RECORDS FIELD | |
|---|---|
| Field 62 | SELLING AGENT (Distribution) |
| Field 63 | DISTRIBUTION FLAG |
| Field 64 | ACTIVATION FLAG |
| Field 65 | CUSTOMER'S Name, Address, Telephone Number and Currency |
| Field 66 | Beneficiary's Name, Address, Telephone Number and Currency |

Server 11 initially creates transaction card records C1-Cr by loading a specific CARD CODE and CARD NUMBER into respective fields 60 and 61. In addition, DISTRIBUTION FLAG (field 63) and ACTIVATION FLAG (field 64) are initially reset to indicate that the corresponding transaction card 95 is a non-distributed, non-activated card.

Figure 4:
FIG. 4 depicts a front view of transaction card 95 for use with system 10 shown in FIG. 1.
Figure 5:
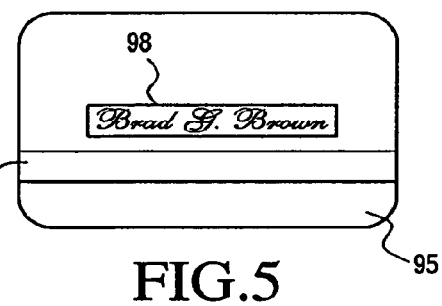
FIG. 5 depicts a rear view of transaction card 95 illustrated in FIG. 4.

As will become clear from the following description and with reference to FIGS. 4 and 5, each of the transaction card records C1-Cn corresponds to a unique transaction card 95. In addition, each of the transaction records T1-Tq (also referred to as a "folio") is associated on a 1:1 basis with only one of the transaction card records C1-Cn. However, transaction card records C1-Cn can be associated (on a k:1 basis where k≥1) with any number of transaction records T1-Tq.

Figure 6:
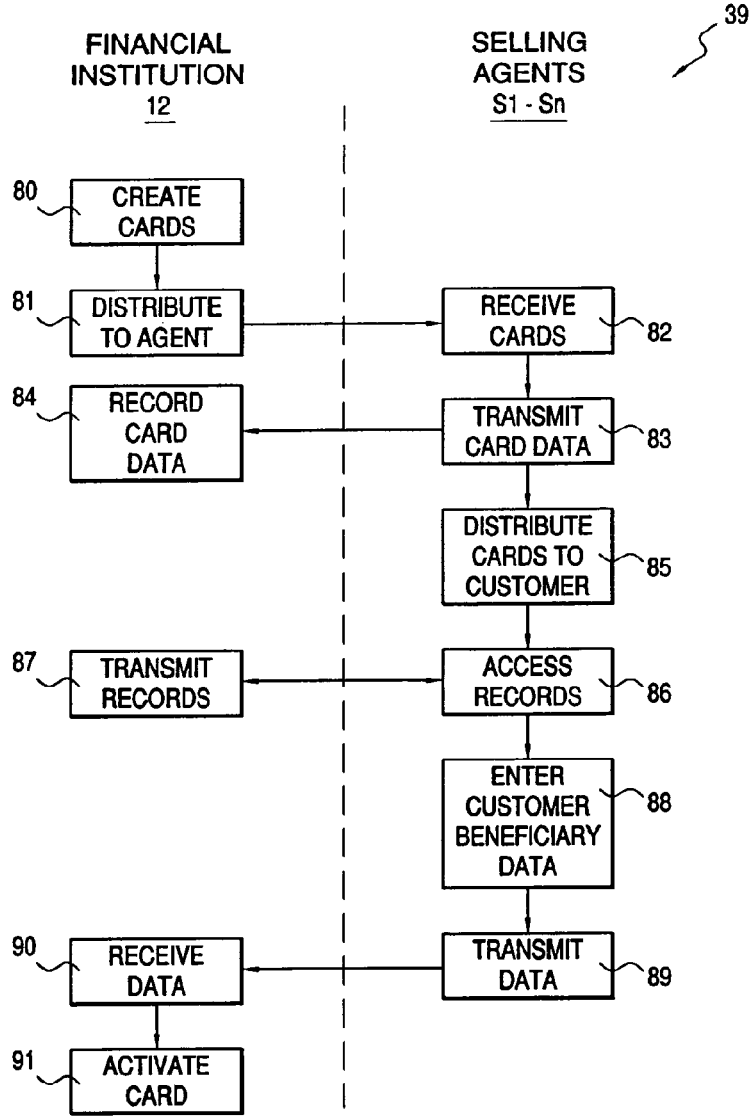
FIG. 6 depicts a flow diagram illustrating a card distribution and activation process 39, which embodies the teachings of the present invention.

FIG. 6 illustrates transaction card distribution and activation process 39. Financial institution 12 performs a portion of this process (shown in the left side of this figure). The remainder of process 39 (shown in the right side of this figure) is performed by each of the selling agents S1, . . . , Sn, at its respective site.

Transaction card distribution and activation process 39 begins with acquire-cards step 80. Through step 80, institution 12 acquires, from a card manufacturer or the like, a number of "generic" transaction cards 95 (see FIGS. 4 and 5) (i.e., "generic" in the sense of not having any customer records or beneficiary data associated therewith). Transaction cards 95 are preferably durable plastic cards similar, in size, shape and configuration, to a conventional credit card. Each such transaction card is stamped (typically embossed) with card number 96 (see FIG. 4), visible from the card front and corresponding to a CARD NUMBER (field 61) (see FIG. 3). The back of transaction card 95 includes conventional signature strip 98 and magnetic strip 99. Magnetic strip 99 is encoded with a unique alphanumeric card code corresponding to a CARD CODE (field 60) (see FIG. 3).

Server 11, at institution 12, initially loads each card number 96 into CARD NUMBER (field 61) and each corresponding magnetically stored card code into CARD CODE (field 60). This can done, most likely, through computer download of the information from, e.g., a card supplier (such as the card manufacturer) to the financial institution at the time a batch of cards are manufactured, by supplying a magnetic tape or diskette (or other media) containing that information for subsequent download by the institution once the cards are delivered to it, or subsequently when the cards are distributed by the selling agents to their respective customers. In addition, for each card 95, computer 31 resets DISTRIBUTION FLAG (field 63), indicating that a selling-agent has not yet received the corresponding transaction card or, in the case of a transaction card record being instantiated when that card is distributed to its customer, the distribution flag is set at the time that record is created. Further, host computer 31 resets ACTIVATION FLAG (field 64), indicating that the corresponding card 95 is a non-activated card.

In distribute-to-agent step 81, institution 12 distributes non-activated transaction cards 95 to a number of selling agent sites S1-Sn. Selling agents distribute one or more non-activated transaction cards 95 to customers, in distribute-to-customer step 85. Since these cards are not activated, the selling agents do not need to distribute the cards in a secure manner.

After receiving cards 95, in step 82, the selling agents transmit card data for each card 95 to server 11, via transmit step 83. Specifically, a selling agent enters the selling agent's ID, via keypad 16, and simply swipes each card 95 through a magnetic strip reader 15 on terminal 14 at the time the cards have been distributed to their respective customers (users). Terminal 14 transmits a card code and the selling agent's ID to server 11, via PSTN 19. For those agents that have Internet access and also a swipe card reader, the information provided by the swipe reader can be routed through the client computer to appropriately populate an "activation" web page provided by a transaction server at institution 12 and then send the data on the populated page to that server for use in updating database 32. In any event, through record-data step 84, server 11 receives the card data and accesses the card record, from card records C1-Cr previously stored in database 32, that corresponds to the received card code. For the retrieved card record, server 11 sets DISTRIBUTION FLAG (field 63), indicating that a customer has received the corresponding transaction card, and loads the selling agent's ID into SELLING AGENT field (field 62).

When a customer first receives a transaction card, that card already has a corresponding record established in database 32. However, the customer cannot use the transaction card 95 until the corresponding card record C1-Cr indicates that the card is activated. Server 11 activates card 95 by setting the corresponding ACTIVATION FLAG (field 64). In addition, the record must also contain customer and beneficiary information as CUSTOMER DATA (fields 65) and BENEFICIARY DATA (field 66).

A selling agent requests activation of a transaction card 95 via his or her client computer 21 and Internet 30. To do so, that selling agent begins by establishing an internet connection to a web site maintained by institution 12, which provides a transaction card activation web page for display at a browser executing at the agent's client PC. The agent then accesses, through the site, a record of a card based on the unique card number associated with that card, from database 32, in access-records step 86 via server 11. Using client computer 21, the selling agent enters a transaction card number 96, provided by a customer, into the page and sends an HTTP (hypertext transfer protocol) request containing this number, from the browser trail to the web server. In response, a copy of the appropriate record, say transaction card record C1, is transmitted, in transmit-record step 87, as an HTML file that displays, via the agent's browser and on a subsequent web page, on the selling agent's monitor 22. Using the selling agent's keyboard 23 and mouse 24, the selling agent, in enter-data step 88, enters customer and beneficiary data into the web page then displayed on monitor 22. Specifically, the customer's name, address, telephone number and currency (e.g., U.S. Dollars) are entered into appropriate locations in the page. In addition, the selling agent enters the beneficiary's name, address, telephone number and currency (e.g., Mexican Pesos). After entering all of the necessary data, the selling agent transmits, in transmit-data step 89, the resulting page through the browser, as an HTTP request, to server 11 (see FIG. 1) at institution 12. This page includes an instruction, issued by agent depression of or clicking on an associated "button" or other user-activated hypertext field (commonly called a "widget") displayed on that page which prompts a request to activate the corresponding transaction card.

Server 11 receives the HTTP request, in receive-data step 90 (see FIG. 6), and through activate-card step 91, activates the appropriate card record, e.g., transaction card record C1. Specifically, server 11 sets an ACTIVATION FLAG (field 64), and loads the customer's and beneficiary's names, addresses, telephone numbers and currencies in the respective fields 65 and 66.

Thus, at this stage, the transaction card record, e.g., transaction card record C1, which corresponds to the customer's transaction card 95, holds a set of parameters that defines, except for the transaction amount, a distinct unique transaction between a particular customer and a particular beneficiary. Consequently, a selling agent can initiate a money transfer by simply entering a selling agent ID and a transaction amount, via keypad 16, and then swiping the customer's card 95 in magnetic strip reader 15.

Figure 7:
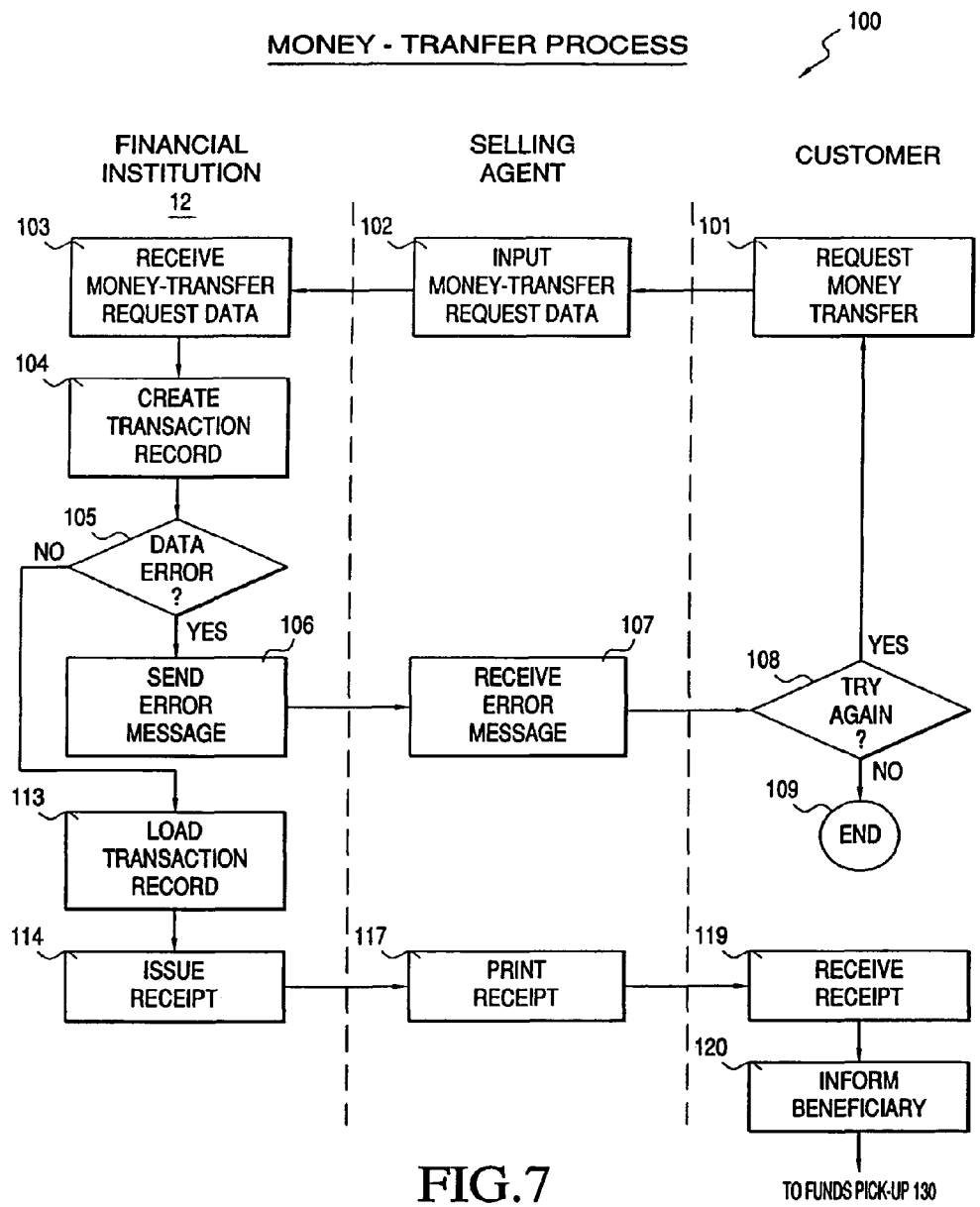
FIG. 7 depicts a flow diagram illustrating money-transfer process 100 in accordance with the present invention.

FIG. 7 depicts money-transfer process 100. Institution 12 performs a portion of this process (shown in the left side of this figure), while the selling agents, S1-Sn, performs the steps located in the center of FIG. 7. Finally, the customers wishing to transfer money to a beneficiary perform the steps located in the right side of FIG. 7.

Money-transfer process 100 commences with customer-request step 101. In step 101, a customer with a previously activated transaction card 95 visits a selling agent's site, e.g., site S2, to arrange a money transfer to a beneficiary. The customer presents a transaction card 95 to the selling agent and pays the selling agent an amount that includes the amount to be transferred and a transaction fee.

In input-data step 102, a selling agent enters money-transfer request data via keypad 16 and magnetic strip reader 15 on terminal 14. Specifically, the selling agent keys in its selling agent ID and a transaction amount via keypad 16, and then swipes transaction card 95 through magnetic strip reader 15 to enter the card code of that card. In input-data step 102, terminal 14 transmits the selling agent's ID, the amount and the card code to server 11 via PSTN 19 (or, as discussed above, through an appropriate web page provided by server 11 through an Internet connection).

Upon receiving the transaction request, in receive-data step 103, server 11 creates one of the transaction records T1-Tq, e.g., transaction record T1. Thus, in create-record step 104, server 11 begins by creating unique transaction and control numbers. Server 11 then enters the transaction number into TRANSACTION NUMBER (field 42), the control number into CONTROL NUMBER (field 45), the card code into CARD CODE (field 40), and the selling agent's ID into SELLING AGENT (field 53). In addition, server 11 enters a transaction status code, e.g., "OPEN", into STATUS (field 52), to indicate that the corresponding transaction is an open transaction. Further in create-record step 104, using the card code received in step 103, server 11 searches transaction card records C1-Cr for a card record with a matching CARD CODE (field 60).

Upon finding a match, server 11 copies data from the matching transaction card record, e.g., record C1, to the transaction record being created, e.g., record T1. Specifically, server 11 copies CARD NUMBER from field 61 to field 41, CUSTOMER DATA from field 65 to field 55 and BENEFICIARY DATA from field 66 to field 56. Next, computer 31 calculates and enters TRANSACTION FEE (field 48), TRANSFERRED AMOUNT (field 47), FUND-PICK-UP AMOUNT (field 51), using, if necessary, EXCHANGE RATE (field 50), and TOTAL AMOUNT (field 49). Finally, server 11 enters TRANSACTION DATE (field 43) and TRANSACTION TIME (field 44) with the current date and time. Computer 31 leaves blank the PAYING AGENT (field 54), PICK-UP DATE (field 57) and PICK-UP TIME (field 58), which are filled in when the beneficiary picks up the funds.

If no match occurs or a data error results during execution of create-record step 104, as determined in decision step 105, server 11 returns an error message to the selling agent in send error message step 106. The selling agent receives the error message, in receive-error message step 107, as an image on display 17 (if the terminal is being used) and/or as an HTML file rendered by the browser executing at client computer 21 (if web access is being used). In those instances where the customer wishes to try again, the process exits the YES path of decision step 108 and returns to request step 101. Otherwise, the process terminates via a NO path of decision step 108 to end step 109.

If no data errors occurred, then process 100 advances, via a YES path of decision step 105, to load-record step 113. In load-record step 113, server 11 loads the transaction record created in create-record step 104, e.g., transaction record T1, into database 32. Next, in issue-receipt step 114, server 11 issues a money-transfer receipt in the form of a data transmission to the selling agent at, for example, selling-agent site S2. Upon receiving the money-transfer receipt data, the selling agent's terminal 14 prints a transaction receipt via terminal printer 18. In this regard, FIG. 1 shows printer 18 at selling-agent site S2 printing a transaction receipt in the form of printed slip 18'. Printer 18 prints at least two copies of the transaction receipt (printed slip 18'), which the customer signs. The selling agent retains a copy, while giving the customer a copy, in receive-receipt step 119.

A preferred transaction receipt contains the following information, as shown in Table 3 below:

TABLE 3

| TRANSACTION RECEIPT |
|---|
| FINANCIAL INSTITUTION'S |
|    NAME, ADDRESS AND TELEPHONE NUMBER |
| SELLING AGENT'S |
|    NAME, ADDRESS AND TELEPHONE NUMBER |
| CARD NUMBER |
| TRANSACTION NUMBER |
| TRANSACTION DATE |
| TRANSACTION TIME |
| CONTROL NUMBER |
| FUND-PICK-UP NUMBER |
| IN CUSTOMER CURRENCY (e.g., US Dollars): |
|    TRANSFERRED AMOUNT |
|    TRANSACTION FEE |
|    TOTAL AMOUNT |
| IN BENEFICIARY CURRENCY (e.g., Mexican Pesos): |
|    FUND-PICK-UP AMOUNT |
| EXCHANGE RATE |
| CUSTOMER'S |
|    NAME, ADDRESS AND TELEPHONE NUMBER |
| BENEFICIARY'S |
|    NAME, ADDRESS AND TELEPHONE NUMBER |
| CUSTOMER'S SIGNATURE |

Upon receiving the transaction receipt in receive-receipt step 119, the customer contacts the beneficiary in inform-beneficiary step 120. The customer informs the beneficiary of the fund-pick-up ("folio") number and amount, by, for example, a telephone call, an e-mail message, or a facsimile transmission.

Figure 8:
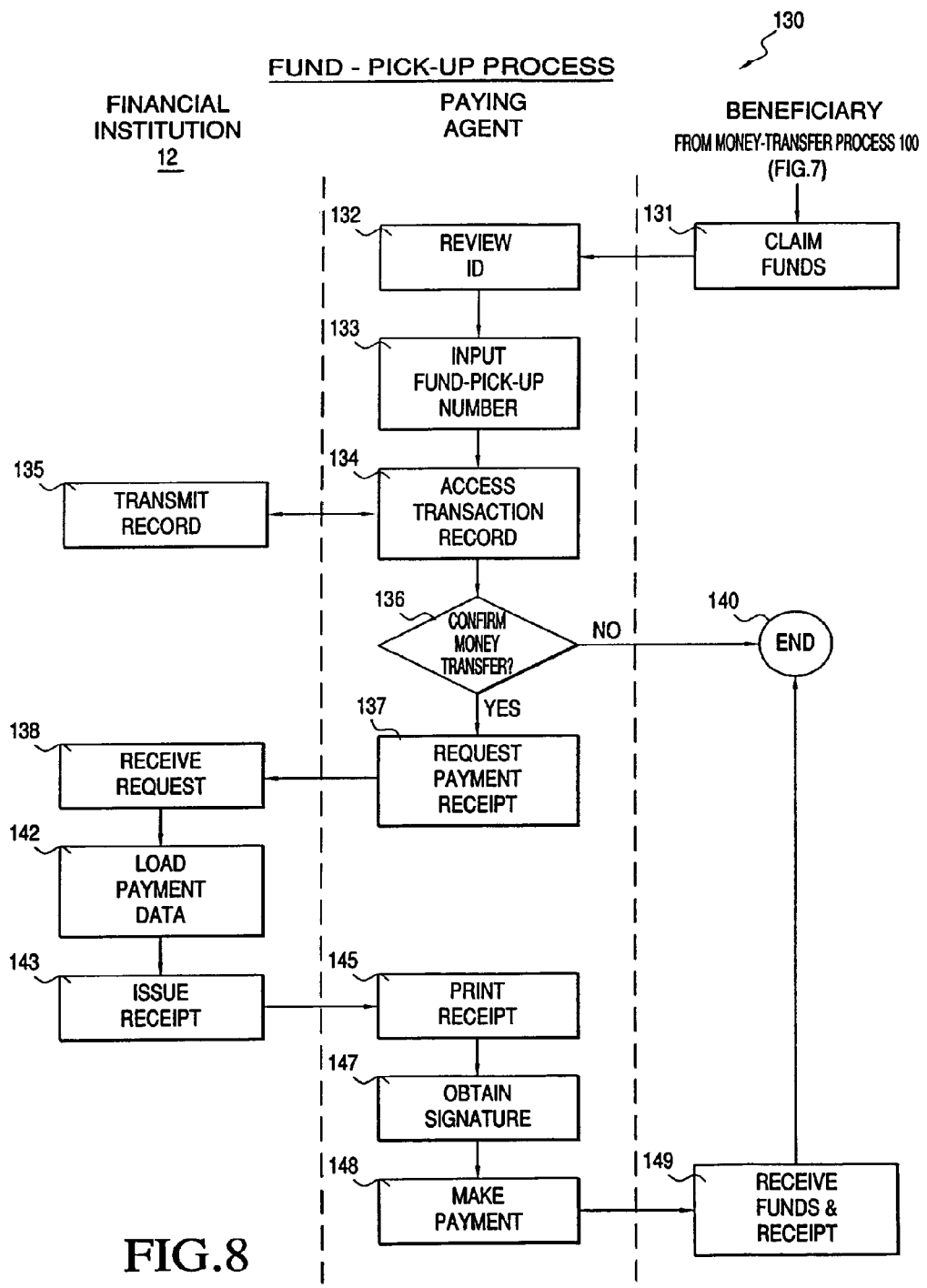
FIG. 8 depicts a flow diagram illustrating fund-pick-up process 130 in accordance with the present invention.

FIG. 8 illustrates fund-pick-up process 130. Institution 12 performs the steps located in the left side of FIG. 8, while each of the paying agents, at P1-Pm, performs the steps located in the center of FIG. 8. Finally, the beneficiary performs the steps located in the right side of FIG. 8.

In claim-funds step 131, a beneficiary claims funds from a paying agent by presenting a folio number and proper personal identification, preferably a photo ID such as a driver's license, passport, etc. After reviewing the customer's identification, in review-ID step 132, the paying agent uses the folio number to access a copy of the corresponding transaction record, e.g., transaction record T1, from institution 12. Specifically, using Internet 30 and the paying agent's client computer 21, in input step 133, the paying agent establishes an Internet connection to server 11 to obtain a "payment" page. Through this page, the agent inputs the folio number that the beneficiary provided.

The paying agent transmits, through its browser and as an HTTP request, the request in access-record step 134. Server 11 responds, via Internet 30, in transmit-record step 135 with a web page providing payment authorization, including the amount to be paid and the currency in which payment is to be made, and the name and address of the beneficiary to whom this amount is to be paid. Specifically, a web page containing a copy of the data stored in the corresponding transaction record is displayed on the paying agent's monitor 22. The paying agent, in decision step 136, confirms the validity of the money transfer using the beneficiary's identification and transaction data 27 displayed on monitor 22. If the beneficiary's identification matches the displayed transaction data 27 for the corresponding transaction record, e.g., transaction record T1, the paying agent authorizes payment of the amount displayed in FUND-PICK-UP AMOUNT (field 51).

Upon authorizing payment, the paying agent requests, by clicking or depressing an appropriate widget on the payment page, that server 11 issue a payment receipt, in request-receipt step 137. If the paying agent finds that the beneficiary's identification does not match the transaction data 27, in decision step 136, the paying agent refuses the payment and so informs the beneficiary. Process 130 then ends through step 140.

After receiving a request for a payment receipt, in receive-request step 138, server 11 loads payment data into the corresponding transaction record, here transaction record T1, in load-data step 142 in database 32 to effectively "close-out" the transaction. Specifically, server 11 enters a payment code, e.g., "PAID", into STATUS (field 52), indicating that the funds were paid. In addition, server 11 enters a date into PICK-UP DATE (field 57), a time into PICK-UP TIME field (field 58) and a paying agent's ID into PAYING AGENT field (field 54).

Server 11 next issues a payment receipt, in issue-receipt step 143. In particular, server 11 transmits the following data (listed in table 4 below) in the form of a displayed web page, which, through the agent's browser, is displayed on the paying agent's monitor 22.

TABLE 4

DISPLAYED PAYMENT DATA

FINANCIAL INSTITUTION'S
    NAME ADDRESS AND TELEPHONE NUMBER
PAYING AGENT'S
    NAME, ADDRESS AND TELEPHONE NUMBER
PICK-UP DATE
PICK-UP TIME
CONTROL NUMBER
FUND-PICK-UP NUMBER
CUSTOMER'S
    NAME, ADDRESS AND TELEPHONE NUMBER

TABLE 4-continued

DISPLAYED PAYMENT DATA

BENEFICIARY'S
    NAME, ADDRESS AND TELEPHONE NUMBER
IN CUSTOMER CURRENCY (e.g., US Dollars):
    TRANSFERRED AMOUNT
    TRANSACTION FEE
    TOTAL AMOUNT
IN BENEFICIARY CURRENCY (e.g., Mexican
    Pesos):
    FUND-PICK-UP AMOUNT
EXCHANGE RATE
BENEFICIARY'S SIGNATURE Using printer 25, in print-receipt step 145, the paying agent prints two copies of the payment receipt, which the beneficiary signs, in obtain-signature step 147. In make-payment step 148, the paying agent gives the beneficiary the transferred amount of money along with one copy of the payment receipt. After the beneficiary receives the funds and the receipt, in receive-funds step 149, fund-pick-up process 130 ends in step 140.

The selling agents preferably deposit the funds they collect into a specified bank account for transmission to financial institution 12. In turn, the institution typically distributes funds to the paying agents by, for example, crediting an account or issuing a check. Of course, the invention contemplates that numerous procedures are available for clearing accounts, i.e., for collecting funds from and paying funds to the paying and selling agents.

In those instances where a beneficiary fails to collect funds within a particular time, e.g., thirty days, server 11 is programmed to automatically cancel the transaction. For instance, the server cancels the transaction, by, for example, changing the contents of the STATUS field (field 52) from "OPEN" to "EXPIRED". At that time, institution 12 informs the customer, via mail or telephone, that the beneficiary failed to pick-up the funds and that the transaction expired. In addition, at that time, arrangements may be made to, e.g., issue a refund to the customer.

Figure 9:
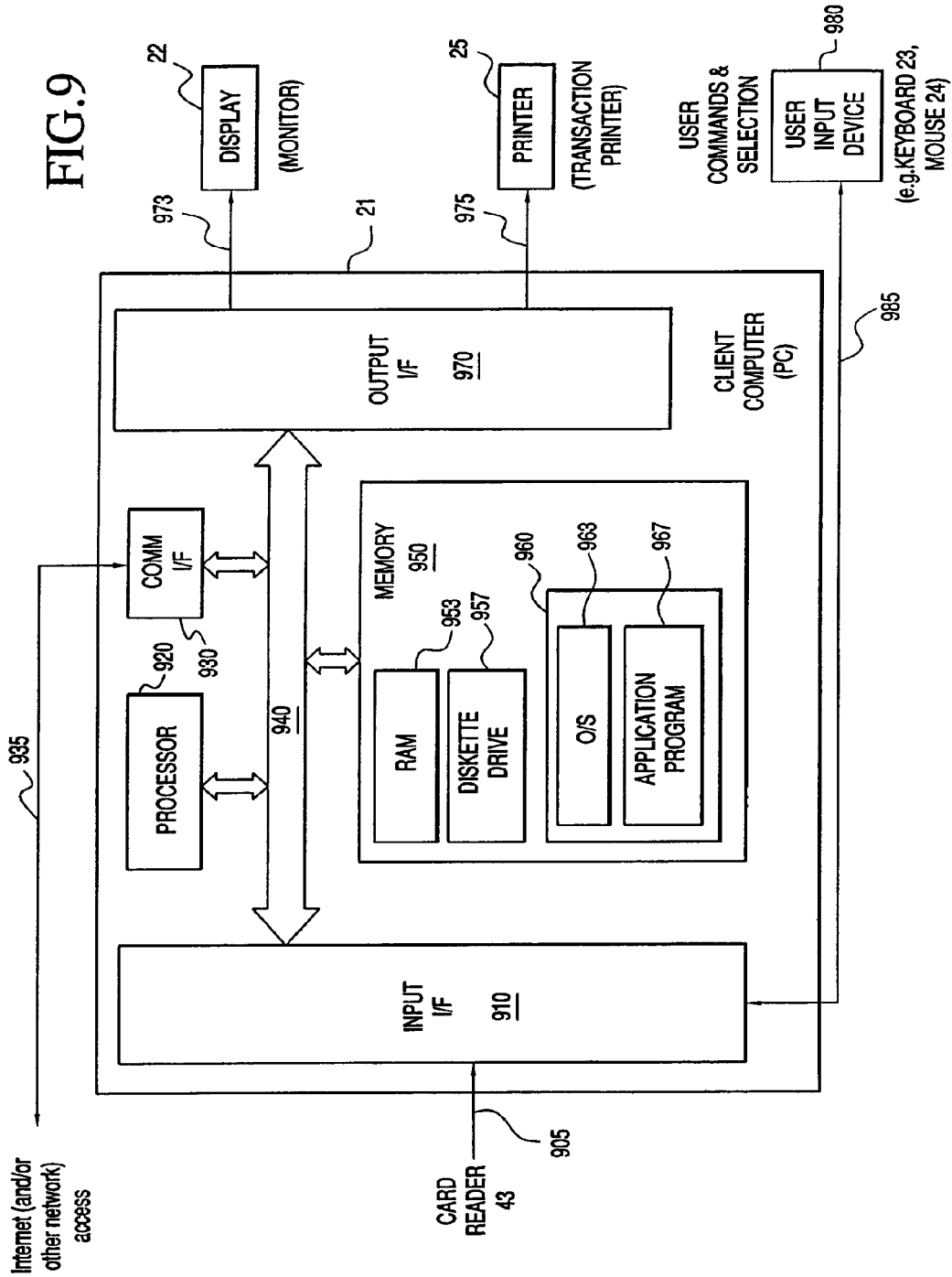
FIG. 9 depicts a high-level block diagram of illustrative client computer 21 located at either a selling or paying agent.

FIG. 9 depicts a block diagram of client computer (PC) 21 located at either a selling or paying agent, and which is used in implementing the present invention.

As shown, client computer 21 comprises input interfaces (I/F) 910, processor 920, communications interface (COMM I/F) 930, memory 950 and output interfaces 970, all conventionally interconnected by bus 940. Memory 950, which generally includes different modalities, including illustratively random access memory (RAM) 953 for temporary data and instruction store, diskette drive(s) 957 for exchanging information, as per user command, with floppy diskettes, and non-volatile mass store 960 that is implemented through a hard disk, typically magnetic in nature. Mass store 960 may also contain a CD-ROM or other optical media reader (not specifically shown) (or writer) to read information from (and write information onto) suitable optical storage media. The mass store stores operating system (O/S) 963 and application program 967; the latter implementing client processing used in the present invention. O/S 963 may be implemented by any conventional operating system, such as the WINDOWS NT operating system ("WINDOWS NT" is a registered trademark of Microsoft Corporation of Redmond, Wash.). Given that, we will not discuss any components of O/S 963 as they are all irrelevant. Suffice it to say, application program 967 executes under control of the O/S.

Incoming information can arise from two illustrative external sources: network supplied information, e.g., from Internet 30 and/or other packet networked facility, through network connection 935 to communications interface 930, or from a dedicated input source, via path(es) 905, to input interfaces 910. Here, dedicated input can arise from swipe card reader 43, in those agent sites that employ both that reader and a client computer for accessing server 11 (see FIG. 1) through an Internet connection.

Input interfaces 910 contain appropriate circuitry to provide necessary and corresponding electrical connections required to physically connect and interface card reader 43 (as well as any other dedicated input devices, not shown) to client computer 21. Under control of the operating system, application program 967 may exchange commands and data, via network connection 935 to server 11, or path(es) 905 with terminal 14, to transmit and receive information, to the extent needed, during transaction processing.

Input interfaces 910 also electrically connect and interface user input device 980, such as keyboard 23 and mouse 24, to the client computer. Display 22, such as a conventional color monitor, and printer 25, such as a conventional laser printer used as a transaction printer, are connected, via leads 973 and 975, respectively, to output interfaces 970. The output interfaces provide requisite circuitry to electrically connect and interface the display and printer to the computer system.

Furthermore, since the specific hardware components of client computer 21 as well as all aspects of the software stored within memory 950, apart from the various software modules, as discussed below, that implement the present invention, are conventional and well-known, they will not be discussed in any further detail.

As noted above, the present invention is susceptible of implementation in a client-server environment where either or both a selling and paying agent utilize client computer 21 to access server 11, either through a dial-up telephonic connection or an Internet web-based connection.

Figure 10:
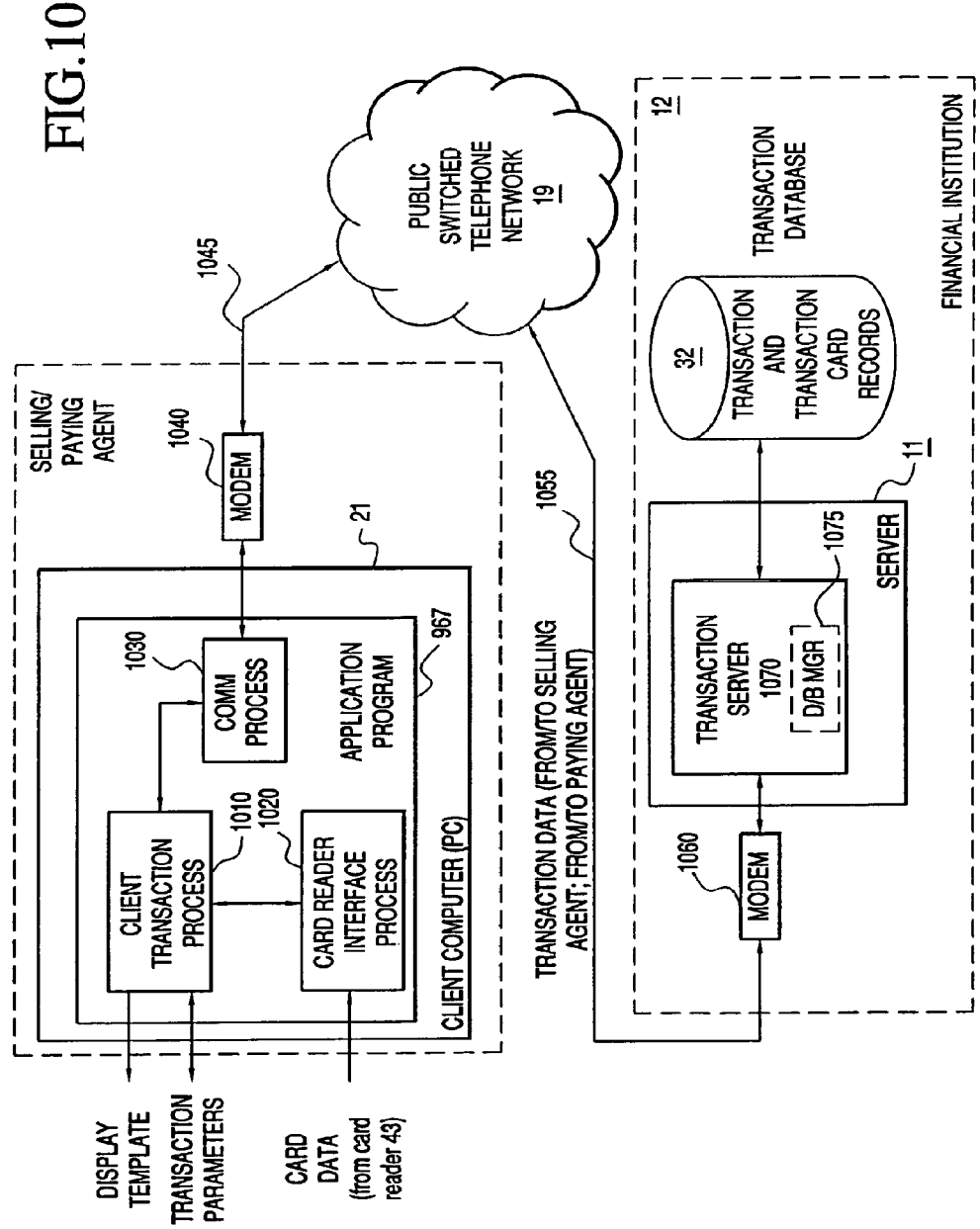
FIG. 10 depicts a high-level block diagram of the software processes utilized by the present invention in a client-server embodiment with PSTN-based communication occurring between an agent and server 11.

In that regard, FIG. 10 depicts a high-level block diagram of the software processes utilized by the present invention in a client-server embodiment with PSTN-based communication occurring between an agent and server 11. The same basic methodology described below in connection with this figure applies to use of a POS terminal, e.g., terminal 14, in lieu of a client PC.

As shown, application program 967 executing within client computer 21 contains client transaction process 1010, card reader interface process 1020 and communication (COMM) process 1030. The client computer, when accessing server 11 at the financial institution, establishes a dial-up circuit-switched connection, through local modem 1040, communication line 1045, PSTN 19 and communication line 1055, to peer modem 1060 situated within the financial institution and connected to server 11. Though server 11 may utilize quite a number of modems in order to handle a relatively large number of transactions involving quite a number of different agents, for purposes of simplifying this figure (as well as FIG. 11 which is discussed below), I will discuss this figure (as well as FIG. 11) in the context of just one transaction.

When an agent desires to initiate a transaction, whether it is a selling agent seeking to activate a transaction card for a customer or initiate a money transfer from the customer to his(her) designated beneficiary, or a paying agent seeking to access a transaction record and to effect a payment to a beneficiary, that agent first initiates execution of client transaction process 1010. This process performs all client transaction processing for both card activation (i.e., sales), money transfer initiations and beneficiary payment.

Generally speaking, for card activation, process 1100 obtains card data through card reader 43, which is connected to client computer 21, queries the agent for and obtains other transaction data through direct keyboard entry, locally displays transaction data on a local monitor, and exchanges transaction data, via communication process 1030, with server 11. Process 1010 may also obtain transaction data from other peripheral input devices (conventional and not shown) that might be used to obtain transaction data from the agent. For a payment transaction, this process requires obtaining a folio number from the beneficiary, through manual keyboard entry by the agent, using the folio number to retrieve an associated transaction record data from server 11 and exchanges payment information with the server regarding the status of the payment, e.g., to "close-out" the transaction in the event of a payment to an authorized beneficiary.

In particular, prior to the start of any transaction, e.g., when process 1010 begins executing or after it has completed a transaction, it displays a transaction start screen display on the local monitor for the agent's use. This screen display contains appropriate instructions as well as a conventional soft-selection field for the agent to indicate whether (s)he wants to initiate a card activation or a payment transaction. Should the agent signify a card activation transaction, process 1010 then displays an appropriate data entry screen containing a data entry field for the transaction card number (card data). This number can be entered manually by the agent or alternatively, through card reader interface process 1020, by the agent simply swiping the transaction card of the customer through the card reader 43 when instructed to do so by the screen display. The resulting card data is captured by process 1020 and supplied to client transaction process 1010. Thereafter, process 1010, through communication process 1030, establishes a dial-up connection, through modem 1040, to server 11 situated at the financial institution. Once this connection is established, process 1010 transmits the card number and transaction type (here, card activation) to server 11. This server, in turn, accesses, through its internal transaction server 1070, which, in turn and operating in conjunction with database manager 1075, accesses the corresponding transaction card record from transaction database 32. If this record exists, i.e., the card is valid, transaction server 1070 transmits a suitable access-successful/activation-start message back to client computer 21 and specifically to client transaction process 1010 executing thereat. In response to this message, process 1010 displays a transaction template containing various fields through which the agent queries the customer for customer and beneficiary information, as delineated above. Once the agent signifies, again through use of an appropriate soft-selection key, that all the information is entered, process 1010 then transmits this information through the dial-up connection, then existing between client computer 21 and server 11, and particularly to transaction server 1070 situated within server 11. Upon receipt of this information, server 1070 updates the transaction card record for this transaction card with the information supplied by the agent and also updates the card record to signify that that particular transaction card is now activated and ready for subsequent use in transferring funds between the customer and his(her) designated beneficiary. Once the transaction card record has been so updated and the card activated, transaction server 1070 broadcasts a suitable card-activated/complete message back to client computer 21, and specifically to client transaction process 1010. Process 1010 provides a visual notification to the agent that the card is now activated, who, in turn, can appropriately notify the customer.

Should the agent select a money transfer initiation instead of a card activation, process 1010 displays an appropriate data entry screen to prompt the agent to enter a transaction card number, either manually or by swiping a transaction card then presented by a customer. Once this number is obtained, process 1010 again establishes a dial-up connection to server 11 and within this server to transaction server 1070. After this connection is established, process 1010 transmits the card number and transaction type (here, card activation) to server 1070 which, in turn, accesses the transaction card record for this customer and, if the card number is valid, transmits, within a money-transfer/start message, the customer and beneficiary information in this record back to the client transaction process 1010. In response to this information, process 1010 displays an appropriate display screen containing monetary fields, both in terms of a payment amount and a currency. The agent asks the customer for the amount of the payment to be made. This information, as supplied by the customer, is then manually entered by the agent into the client computer and displayed by process 1010 in the display screen, and then, once confirmed by the agent, communicated, in a suitable money-transfer/amount message, to the transaction server. In response, the transaction server specifies the transaction fee for the transfer and transmits this amount, in a money-transfer/total-amount message, back to the client transaction process 1010. Once the agent has collected the proper amount of funds from the customer, the agent completes initiation of the transaction by confirming the transaction to the client computer, again through depression of an appropriate soft-key. In response, process 1010 transmits this confirmation, as a money-transfer/confirm message, to the server, specifically transaction server 1070, which, in turn, creates a corresponding transaction record, within database 32, for this card and the customer and his(her) beneficiary, in the manner described above and populates that record with information pertinent to that particular transaction. Once this occurs, the transaction server supplies transaction information, through a money-transfer/accept message, back to process 1010 with an instruction to print a two-part transaction receipt, as shown in Table 3 above, for the customer to sign and which provides the folio number for this transaction.

To effectuate payment to a beneficiary, process 1010, through selection of this particular type of transaction, displays a different display screen through which the agent asks the beneficiary for a folio number. As discussed above, this number is unique to each transaction. Once the beneficiary provides this number to the agent, the agent completely enters it and process 1010 locally displays it on monitor 22, the agent then instructs process 1010, again through depression of an appropriate soft-key to establish a dial-up circuit switched connection, through communication process 1030 and modem 1040, to server 11, and then to transmit a payment transaction initiation message containing this folio number and a transaction type (here, payment) to transaction server 1070. In response to this number, server 1070 accesses database 32 to locate a transaction record bearing this folio number. Once this record is located and accessed, server 1070 transmits payment and beneficiary information, within a payment-info message, back to client transaction process 1010. Process 1010 then displays this information on monitor 22. At this point, the paying agent requests personal identification from the beneficiary. If the agent is satisfied by the identification, the agent confirms the transfer through client process 1010, again through depression of an associated soft-key. In response to this confirmation, process 1010 sends a payment-confirm message to transaction server 1070 which, in turn, updates, in the manner described above, the transaction record for this transaction to signify that payment was made and hence the transaction is "closed-out". Once this update occurs, server 1070 sends, via a payment-receipt message, an instruction back to client transaction process 1010 to print a two-part transaction receipt, containing the information shown in Table 4 above, for the beneficiary to sign prior to actual receipt of the transferred funds.

To provide increased security against third-party interception, client process 1010 and transaction server 1070 can each employ appropriate cryptographic processing, such as, e.g., public key cryptography (where each agent is assigned a different public/private key pair by the financial institution with that pair being programmed into application program 967 used by that agent), or symmetric-key cryptography. With public key cryptography, the transaction server uses a public key assigned to a given agent for encrypting transaction information destined to the client computer used by that agent, while that agent uses his(her) own secret key for decrypting messages it so receives from the server. The server utilizes its own public-private key pair in a similar manner. With a symmetric key, the same key is used for both encryption and decryption and is kept secret and secure by both the client computer and the transaction server.

Figure 11:
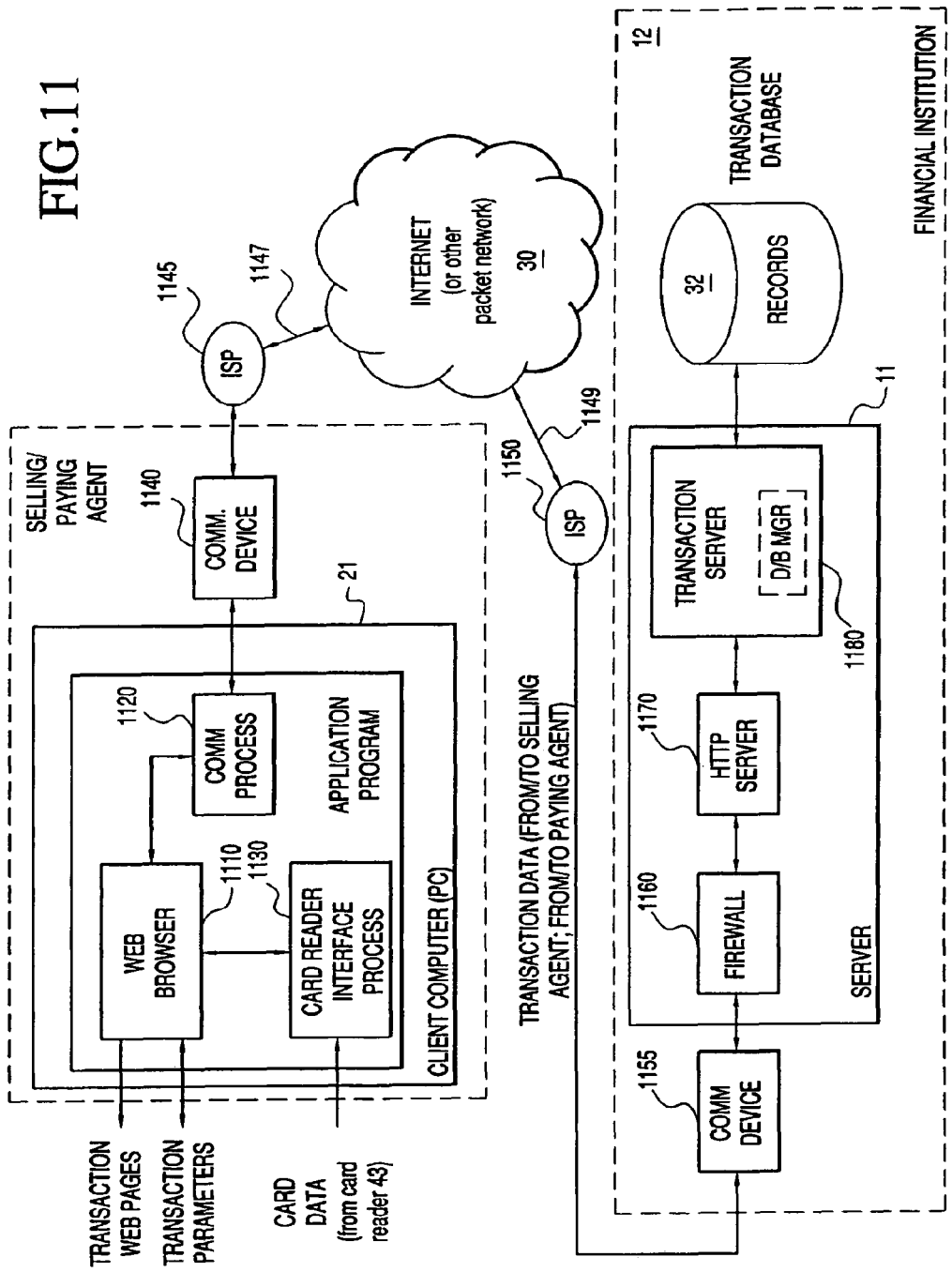
FIG. 11 depicts a high-level block diagram of the software processes utilized by the present invention in a client-server embodiment but with web-based communication occurring between an agent and server 11.

FIG. 11 depicts a high-level block diagram of the software processes utilized by the present invention also in a client-server embodiment but with web-based communication between an agent and server 11.

Here, web browser 1110 takes the place of client transaction process 1010 shown in FIG. 10; financial institution 12 contains a web server (composed of HTTP server 1170 and transaction server 1180) rather than just transaction server 1070 alone. Since the basic client-server transaction processing, apart from the use of web-based messaging, for card activation, money transfer initiation and payment, is essentially identical to that described above in conjunction with FIG. 10, those details will be omitted here.

Rather than a telephonic connection, as shown in FIG. 10, the system shown in FIG. 11 relies on client computer 21 establishing a bi-directional network connection through Internet 30 to server 11. This connection occurs through conventional near-end communication device 1140 (which may be, e.g., a modem, but is not so limited), local Internet Service Provider (ISP) 1145, Internet 30 and far-end ISP 1150 (which serves the financial institution) and ultimately far-end communication device 1155 (which may be, e.g., a router or other device that provides a packet interface to a persistent Internet connection). Server 1180 contains conventional firewall computer 1160, HTTP server 1170 and transaction server 1180. Transaction server 1180 is essentially the same as server 1070 shown in FIG. 10, and hence will not be described any further. Firewall 1160 serves to filter incoming packet communication to server 1180 and, by doing so, significantly frustrate unauthorized access to the transaction server.

Rather than transmitting messages containing transaction data, server 11, specifically transaction server 1180, downloads HTML files containing web page templates which, upon receipt and processing by web browser 1110, are locally displayed to the agent. The agent then enters the information, prompted by various data entry fields in each page, and, through the browser, transmits HTTP requests containing the information back to the server. The agent can also specify the type of transaction desired to the transaction server through appropriate interaction, such as mouse clicks over corresponding display "widgets", with an initial (or home) and/or other web page(s) supplied by server 1180, as well as provide other transaction instructions and/or confirmations to transaction server 1080.

HTTP server 1170 implements a hypertext transfer protocol (HTTP) which is used, by both browser 1110 and transaction server 1180, to transport messages, here financial information and related instructions, over the Internet between the browser and server 1180. Both browser 1110 and HTTP Server 1170 implement both sides of this protocol, including packet encapsulation (assembly) as well as packet dis-assembly. In addition, this server through the use of conventional HTTP GET and POST messages issued by the browser or server manages information flow between browser 1110 and transaction server 1180 to either, as requested by the browser or the transaction server, supply information from database 32 to the browser for local display thereat or update this database with information supplied by the browser.

A transaction card number for a customer can also be supplied through card reader 43, by the agent swiping the card, but with card reader interface process 1130 supplying that information to browser 1110. Browser 1110 can be modified, in a manner readily apparent to those skilled in the art, through addition of, e.g., an appropriate JAVA-implemented routine to properly interact with process 1130 and therethrough obtain transaction card data from card reader 43.

For added security, transaction messages may be protected, through encryption, using conventional SSL (secure socket library) based cryptography in conjunction with HTTP. At the start of a session (here, a transaction session between client computer 21 and server 11), SSL undertakes client-server negotiations to negotiate a particular session key and a cryptographic algorithm, such as an RSA public-key cryptosystem, for both the client and server to use during that session. Once the negotiations conclude, the remaining messages are so encrypted, and communicated in encrypted form, via HTTP packets, during that session using the negotiated key and the algorithm. This encryption and decryption would be handled by browser 1110 and, e.g., HTTP server 1180. SSL is currently used, on a widespread basis, for providing security for Internet-based credit card transactions. Advantageously, SSL does not encrypt HTTP transport layer (i.e., TCP port numbers) fields hence allowing use of load balancing servers (as shown in FIG. 12) at the financial institution to distribute transaction traffic to a given server. For further information on SSL, the reader is directed to, e.g., pages 279 and 474-475 of D. Atkins et al, *Internet Security—A Processional Reference*, (© 1996, New Riders Publishing Co.).

Figure 12:
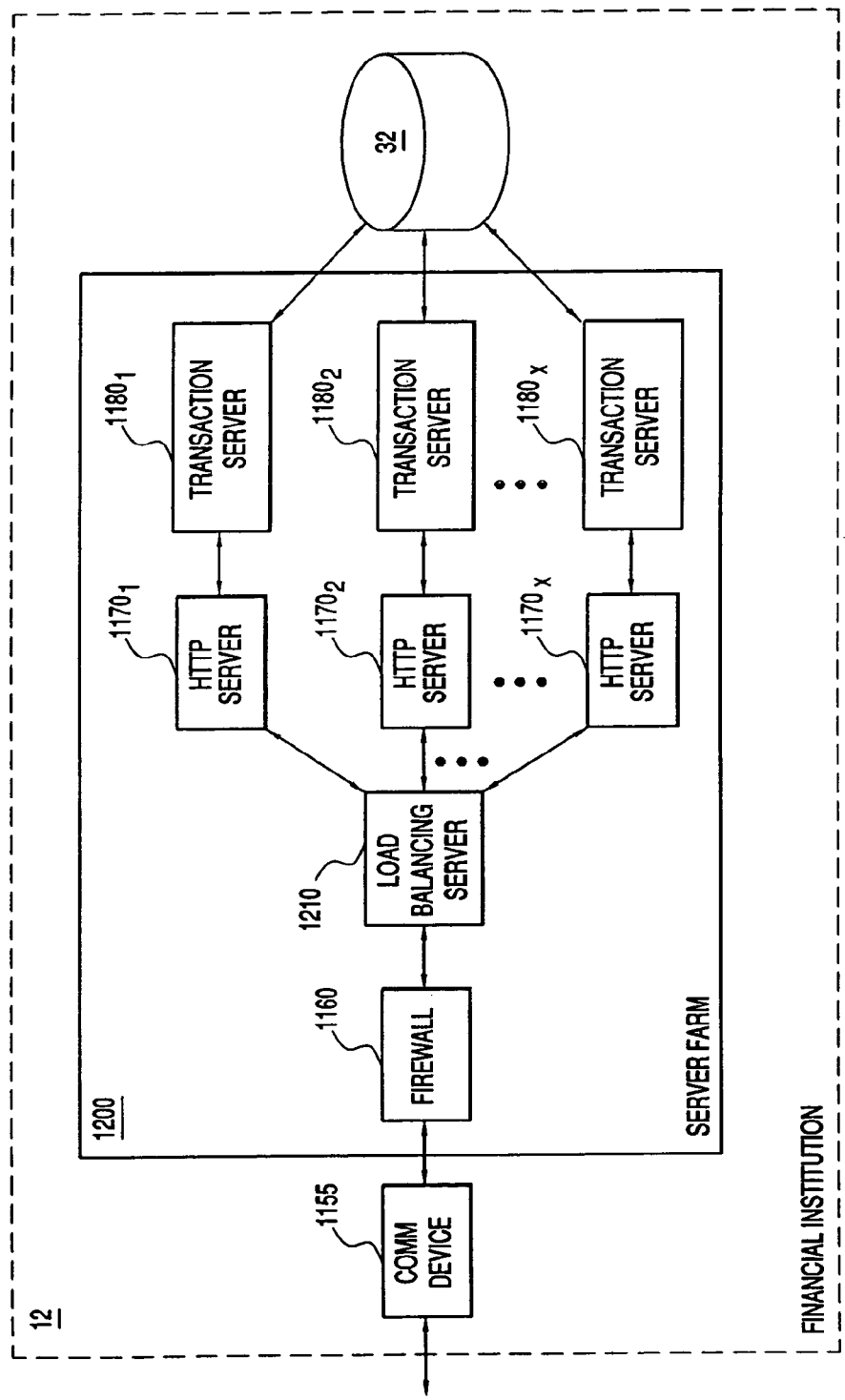
FIG. 12 depicts a high-level block diagram of typical server farm 1200 for use in lieu of server 11, shown in FIG. 11, for processing large numbers of simultaneously occurring web-based financial transactions.
Figure 13:
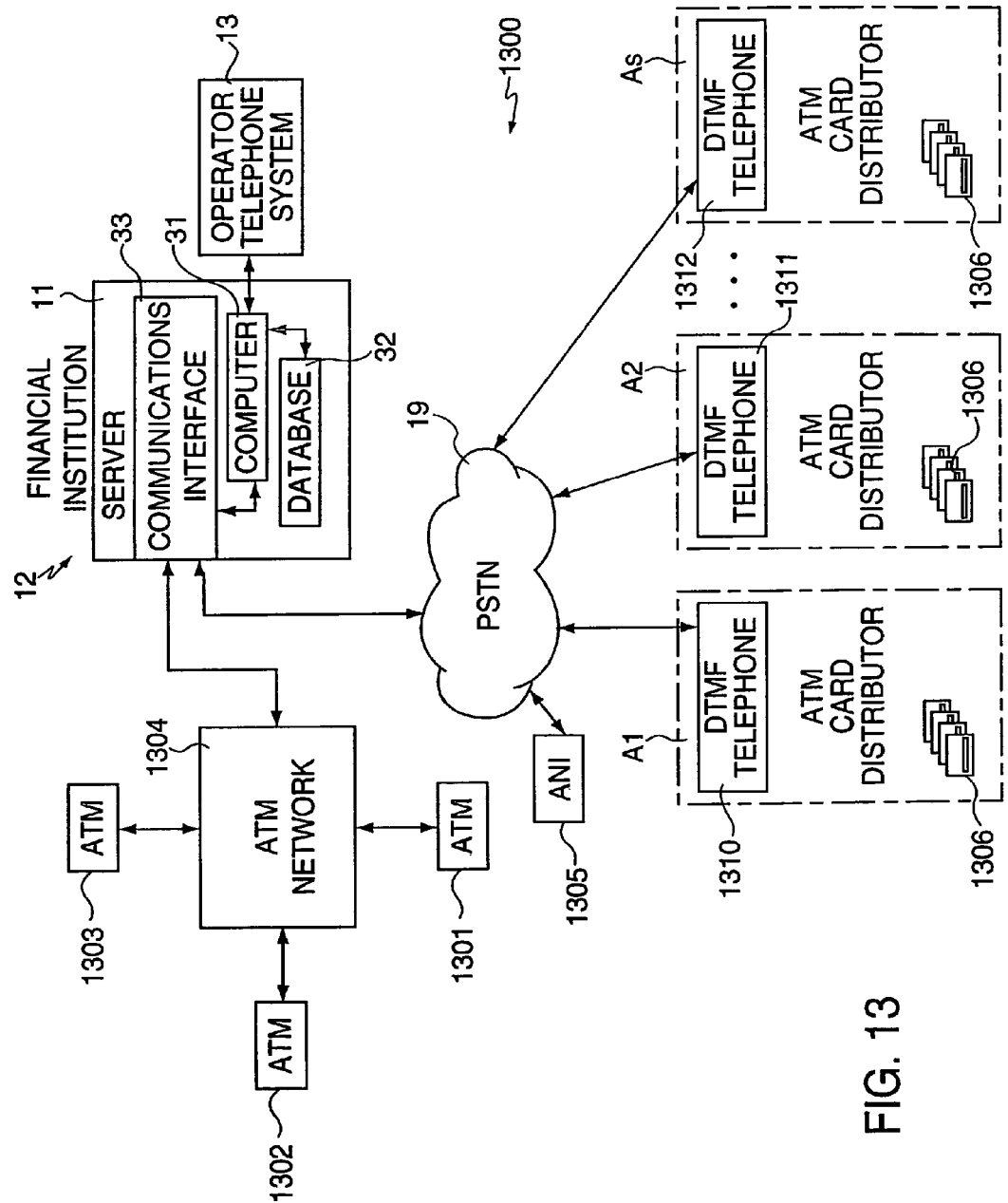
FIG. 13 depicts a high-level block diagram of an embodiment of the present invention.
Figure 14:
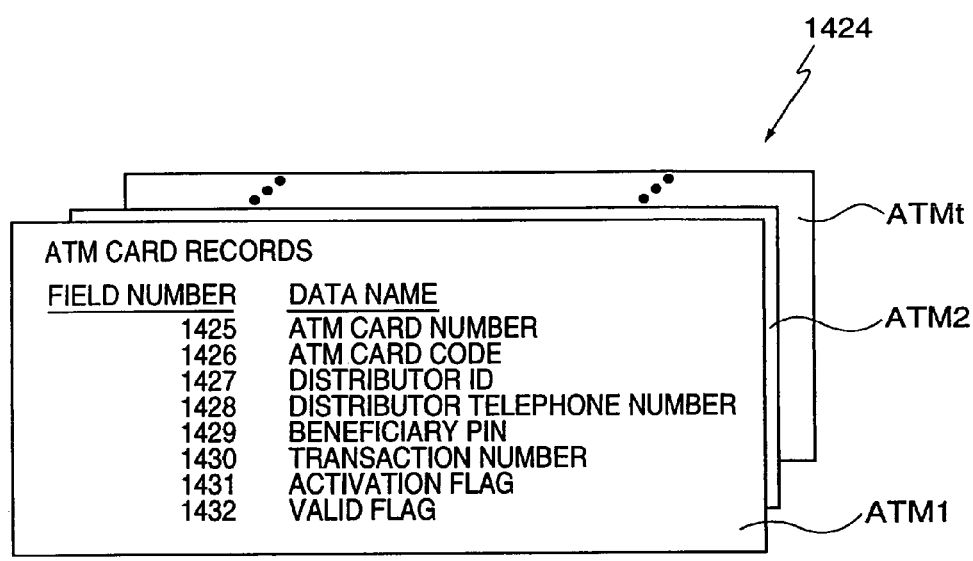
FIG. 14 depicts a diagram showing the structure of ATM card records of an embodiment of the present invention.

FIG. 12 depicts a high-level block diagram of typical server farm 1200 for use in lieu of server 11 for processing large numbers of simultaneously occurring financial transactions.

Here, rather than utilizing just one transaction server 1180, as shown in FIG. 11, server farm 1200, shown in FIG. 12, contains multiple HTTP servers $1170_1, 1170_2, \ldots, 1170_x$, and corresponding transaction servers $1180_1, 1180_2, \ldots, 1180_x$. To provide secure server connectivity, communication device 1155 is connected to conventional firewall 1160 (though of larger capacity than that shown in FIG. 11, but otherwise identical in function). The firewall, in turn, is connected, as shown in FIG. 12, to load balancing server 1210 which distributes new financial transactions to a lightest-loaded HTTP server and transaction server pair in the server farm that is then available to process that transaction. Database 32 permits concurrent access by all the individual transaction servers. However, appropriate and conventional database locking mechanisms are used by the database managers (not shown) in the transaction servers to prevent inadvertent data corruption that would otherwise result from multiple simultaneous accesses being made, by multiple transaction servers, to the same record in the database.

The invention contemplates numerous variations and modifications that will be apparent to those skilled in the art in view of the above description. For instance, card activation and distribution may occur in a number of suitable ways. As described above with respect to card distribution and activation process 39, before giving a customer a transaction card, a selling agent swipes the card in magnetic strip reader 15 (see transmit-data step 83 in FIG. 6). At that point, money-transfer system 10 learns of the existence of that card. In response, server 11 creates a record in database 32 (see record-data step 84). As an alternate procedure, institution 12 could simply record the cards as generic cards with no designation of a selling agent's ID in SELLING AGENT field (field 53). Institution 12 could also load the selling agent's ID into SELLING AGENT (field 53) before distributing transaction cards to the selling agents.

The invention also contemplates that, rather than having a selling agent participate in the card activation process, e.g., via steps 86-90, institution 12 could utilize customer service representatives (CSR) for that purpose. When using a CSR, a customer with a non-activated card 95 could telephone a card center and read the card number 96 from the front face of card 95 to a CSR. Using card number 96, the CSR would then access the record for the corresponding transaction card, e.g., record C1, through server 11. The CSR would then ask the customer to provide the customer and beneficiary information (and possibly, the selling agent's ID), which the CSR loads into CUSTOMER DATA (fields 56) and BENEFICIARY DATA (fields 57) (and possibly, SELLING AGENT (field 54). In addition, the CSR would set DISTRIBUTION FLAG (field 54) and ACTIVATION FLAG (field 55) at this time.

The invention further contemplates that selling-agent sites S1-Sn and paying-agent sites P1-Pm may be located at airports, banks, department and convenience stores, liquor stores, travel agencies, and the like. In some instances, selling and paying agents may be located at the same site. However, paying-agent sites P1-Pm would best include conveniently located establishments that normally have considerable amounts of cash that they would prefer not having on hand, a requirement that is not applicable to selling agents. However, a selling agent can also function as a paying agent.

Because security is a critical issue in money-transfer systems, other, more secure, payment methods may be desirable. For example, a paying agent may electronically credit the delivered funds to a beneficiary's bank account, rather than rely on physical delivery of cash to a beneficiary. Alternatively, a paying agent's printer 25 may print a check, in favor of the beneficiary, at the time that the payment receipt prints (see print-receipt step 145 in FIG. 8) for subsequent access, in a "piece-meal" fashion, if desired, by the beneficiary. Still further, paying agents may make the funds available to a beneficiary through an automatic teller machine, which the beneficiary can deposit or negotiate, as desired.

To assist with security, institution 12 may issue secret personal-identification numbers (PIN's) to selling agents and their employees. Thus, when a selling agent initiates a transaction on behalf of a customer (see input-data step 102 in FIG. 7), institution 12 may require a selling agent to enter two numbers. For example, a selling agent might be required to enter, via keypad 16, a selling agent PIN and an employee PIN, to differentiate different employees working for the same selling agent. Requiring entry of PIN's could increase the difficulty of operating data terminal 14 on an unauthorized basis. Alternatively, each such terminal could be fitted with a processor programmed to store and automatically transmit an agent's ID, PIN and/or a terminal tracking number, whenever a data transmission occurs.

As a security measure and as a possible marketing inducement, selling agents may provide customers with a telephone PIN when initiating a transaction. The customer would then have the option of using the telephone PIN to promptly make a toll-free call to the beneficiary from the selling agent's site. It is felt that prompt disclosure of a folio number and an amount to a beneficiary would enhance security as well as provide additional convenience to the beneficiary.

The above illustrative description shows a single beneficiary listed for each transaction card 95. However, cards 95 may also be issued with more than one beneficiary. A selling agent may select, via keyboard 16, whether one, more or all of the recorded beneficiaries are to pick-up or otherwise receive the funds. In fact, the appropriate transaction card record C1-Cr may name the customer as one of the beneficiaries or the only beneficiary. In that case, a customer, who may be traveling to a distant location, would not need to carry a large amount of cash or traveler's checks. A traveler could arrange to have a folio number available to collect money in a local currency upon arrival at a foreign location.

Although various embodiments which incorporate the teachings of the present invention have been shown and described in detail herein, those skilled in the art can readily devise many other embodiments, modifications and applications of the present invention that still utilize the inventive teachings.

What is claimed is:

1. A method of transferring documents from a party to a transferee via a transfer company, said method comprising:
    generating, by a local computer including a Central Processing Unit (CPU) under the control of the transfer company, unique device codes;
    distributing, by the transfer company, transfer devices to a plurality of parties, each of the transfer devices equipped with a unique device code and being in an inactive state;
    prior to activating the transfer device from the inactive state to a distributed state, restricting access, by the transfer company computer, to a device record within a database;
    creating, by the transfer company computer, a database comprising a set of device records, the computer providing remote access to the database via a communication network;
    loading, by the local computer, each of the unique device codes into a different one of the device records within the database;
    loading, by the local computer, party data, identifying the parties, into the different ones of the device records within the database;
    loading, by the local computer, transferee data, identifying the transferees, into the different ones of the device records within the database;
    activating the transfer device from the inactive state to the distributed state by the transfer company computer;
    prior to activating the transfer device from the distributed state to an activated state, restricting access, by the transfer company computer, to the device record; and
    initiating, in the distributed state, a transfer of a particular document from a requesting party to a particular transferee by the steps of:
    accessing, by the local computer, the device record within the database corresponding to the unique device code on previously distributed transfer device,
    validating, in the distributed state of the transfer device, by the transfer company computer, the unique device code by comparing the unique device code and the transferee's identification information with information in the device record in the database via the transfer company computer;
    activating the transfer device from the distributed state to the activated state by the local computer, wherein the device record is accessible by the local computer in the activated state;
    obtaining, by a computer of the transfer company, the identities of the requesting party and the particular transferee from the accessed device record within the database corresponding to the unique device code,
    generating, by the local computer, a unique pick-up code that refers to a specific transfer of a particular document,
    storing, by the local computer, the unique pick-up code into the accessed device record within the database corresponding to the unique device code,
    providing, by the computer of the transfer company, a unique pick-up code to the requesting party, wherein the computer of the transfer company includes a Central Processing Unit (CPU),
    receiving, by an agent of the transfer company, the unique pick-up code from the transferee,
    accessing, by an agent of the transfer company, a device record on the database of the computer, corresponding to the unique pick-up code received from the transferee, using a remote controlled-computer, under the control of the agent, connected to the communication network,
    verifying, by the agent, the identity of the transferee based on the transferee data stored in the accessed device record corresponding to the presented unique pick-up code,
    providing, by the agent, the particular document to the particular transferee upon verification of the received unique pick up code and the identity of the transferee.

2. The method of claim 1 wherein each of the transfer devices, as distributed to a corresponding one of the users, has no transferee data or device record associated therewith.

3. The method of claim 2 wherein said document comprises currency, and said initiating step includes said requesting party giving said transfer company said currency and said transfer device previously distributed to said requesting party.

4. The method of claim 3 further comprising the step of said transferee giving a different transfer company said pick-up code, and said different transfer company giving said transferee funds corresponding to said currency.

5. The method of claim 4 wherein said distributing step comprises distributing transfer devices, each containing a data-storage medium having said unique device code stored therein in machine-readable form.

6. The method of claim 4 wherein said distributing step comprises distributing transfer devices, each comprising a card with a magnetic strip having said unique device code magnetically stored therein.

7. The method of claim 6 wherein said initiating step comprises said transfer company reading said unique device code from said magnetic strip.

8. A document-transfer system, for transferring documents between parties and transferees via a document-transfer company, comprising:
    a computer connected to a communication network under the control of the document-transfer company, the computer generating a unique device code;
    a plurality of transfer devices each equipped with a respectively unique device code and distributed in an inactive state;

a database of the computer accessible via the communication network, the database comprising a set of device records, each of said device records containing a different one of said unique device codes, data identifying one of said parties, and data identifying one of said transferees, wherein prior to activating a transfer device from the inactive state to a distributed state, restricting access, by the computer, to said device records within the database;

the computer activating the transfer device from the inactive state to the distributed state, wherein, prior to activating the transfer device from the distributed state to an activated state, restricting access, by the transfer company computer, to the device records;

the computer generating, in the distributed state, a unique pick-up code and storing the unique pick-up-code in a particular device record within the database, the unique pick-up code being supplied to said requesting party;

the computer validating, in the distributed state of the transfer device, the unique device code by comparing the unique device code and the transferee's identification information with information in the device record in the database;

the computer activating the transfer device from the distributed state to the activated state, wherein the device records are accessible by the computer in the activated state;

the computer initiating a transfer of a particular document from a requesting party to a particular transferee by accessing one of said device codes from the transfer device previously distributed to said requesting party to locate a corresponding one of said device records from said database to obtain the identities of said requesting party and said particular transferee;

receiving means for receiving by an agent of the document-transfer company of a unique pick-up code from the transferee, accessing means for accessing by the agent of a device record on the database corresponding to the received unique pick-up code via a remote-computer under the control of the agent connected to the communication network;

verifying means for verifying the identity of the transferee by the agent based on the transferee data stored in an accessed device record corresponding to the received unique pick-up code, and providing means for providing the particular document by the agent to the particular transferee upon verification of the received unique pick up code and the identity of the transferee.

9. The system of claim 8 wherein said transfer devices each comprise a data-storage medium having said unique device code therein.

10. The system of claim 9 wherein the data-storage medium stores the unique device code in machine-readable form.

11. The system of claim 10 wherein said transfer devices each comprise a card with a magnetic strip having said unique device code magnetically stored therein.

12. A document-transfer system, for transferring documents between parties and transferees via a document-transfer company, comprising:
a computer connected to a communication network under the control of the document-transfer company, the computer generating a unique device code;
a plurality of transfer devices each equipped with a respectively unique device code and distributed in an inactive state;

a database of the computer and accessible via the communication network, the database of the computer including a Central Processing Unit (CPU), comprising a set of device records, each of said device records containing a different one of said unique device codes, data identifying one of said parties, and data identifying one of said transferees, wherein prior to activating a transfer device from the inactive state to a distributed state, restricting access, by the computer, to said device records within the database;

the computer validating, in the distributed state of the transfer device, the unique device code by comparing the unique device code and the transferee's identification information with information in the device record in the database;

the computer activating the transfer device from the inactive state to the distributed state, wherein, prior to activating the transfer device from the distributed state to an activated state, restricting access, by the computer, to the device records;

the computer initiating, in the distributed state, a transfer of a particular document from a requesting party to a particular transferee by accessing one of said device codes from the transfer device previously distributed to said requesting party to locate a corresponding one of said device records from said database of the computer to obtain the identities of said requesting party and said particular transferee;

the computer activating the transfer device from the distributed state to the activated state, wherein the device records are accessible by the computer in the activated state;

the computer generating a unique pick-up code and storing the generated unique pick-up-code in a particular device record within the database of the computer, the unique pick-up code being supplied to said requesting party, receiving the unique pick-up code, accessing a device record on the database of the computer corresponding to the received unique pick-up code, using a remote controlled-computer under the control of the agent connected to the communication network, and verifying, using transferee data stored in an accessed device record corresponding to the received unique pick-up code, on the database of the computer by the agent, an identity of the transferee, and providing the particular document by the agent to the particular transferee upon verification, via the database of the computer, of the received unique pick up code and the identity of the transferee;

said transfer devices each comprise a data-storage medium having said unique device code therein;

said data-storage medium storing said unique device code in machine-readable form; said transfer comprising a data terminal reading said unique device code from said magnetic strip, and for transmitting a description of said document and said unique device code to said document-transfer company.

13. A document-transfer system for transferring documents between parties and transferees via a document-transfer company, comprising:
a computer connected to a communication network under the control of the document-transfer company, the computer generating a unique device code;
a plurality of transfer devices distributed in an inactive state each having a respective data-storage medium and a respectively unique device code stored in the respective data-storage medium, the respective data-storage medium storing the respective unique device code in machine-readable form, wherein prior to activating a transfer device from the inactive state to a distributed state, restricting access, by the computer, to a set of device records within a database;

the computer validating, in the distributed state of the transfer device, the unique device code by comparing the unique device code and the transferee's identification information with information in the device record in the database;

the computer activating the transfer device from the inactive state to the distributed state, wherein, prior to activating the transfer device from the distributed state to an activated state, restricting access, by the transfer company computer, to the set of device records;

a database of the computer and accessible via the communication network, the database comprising a set of device records data-processor for creating a device database comprising the set of device records, each of the device records containing a different one of the unique device codes, data identifying one of the parties, and data identifying one of the transferees;

a transfer device for initiating a transfer of a particular document from a requesting party to a particular transferee by accessing one of the device codes from the transfer device previously distributed to the requesting party to locate a corresponding one of the device records from the database to obtain the identities of the requesting party and the particular transferee, each of the transfer agents including a data terminal for reading the unique device code from the magnetic strip, and for transmitting a description of the document and the unique device code to the document-transfer company;

the computer generating, in the distributed state, a unique pick-up code and storing the generated unique pick-up-code in a particular device record within the database, the unique pick-up code being supplied to the requesting party, receiving the unique pick-up code, activating the transfer device from the distributed state to the activated state, wherein the set of device records are accessible by the computer in the activated state, accessing a device record on the database of the computer corresponding to the received unique pick-up code, using a remote controlled-computer under the control of the agent connected to the communication network and verifying, using transferee data stored in an accessed device record corresponding to the received unique pick-up code, on the database of the computer by the agent, an identity of the transferee, and providing the particular document by the agent to the particular transferee upon verification, via the database of the computer, of the received unique pick up code and the identity of the transferee.

14. The method of claim 1, wherein the unique pick-up code is associated with a plurality of transferees.

\* \* \* \* \*